(12) United States Patent
Uptigrove et al.

(10) Patent No.: US 10,385,832 B2
(45) Date of Patent: Aug. 20, 2019

(54) SYSTEMS AND METHODS OF UTILIZING AXIAL FLOW EXPANDERS

(71) Applicants: ExxonMobil Upstream Research Company, Houston, TX (US); Mitsubishi Heavy Industries Compressor Corporation, Tokyo (JP)

(72) Inventors: Stan O. Uptigrove, Kuala Lumpur (MY); Dag O. Calafell, II, Katy, TX (US); Peter C. Rasmussen, Navarre, FL (US); Kazushi Mori, Tokyo (JP); Hideki Nagao, Hiroshima (JP)

(73) Assignees: EXXONMOBIL UPSTREAM RESEARCH COMPANY, Houston, TX (US); MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 502 days.

(21) Appl. No.: 14/900,552

(22) PCT Filed: Jun. 27, 2014

(86) PCT No.: PCT/US2014/044485
§ 371 (c)(1),
(2) Date: Dec. 21, 2015

(87) PCT Pub. No.: WO2014/210409
PCT Pub. Date: Dec. 31, 2014

(65) Prior Publication Data
US 2016/0131115 A1    May 12, 2016

Related U.S. Application Data

(60) Provisional application No. 61/840,792, filed on Jun. 28, 2013.

(51) Int. Cl.
*F01D 25/24* (2006.01)
*F03G 7/04* (2006.01)
(Continued)

(52) U.S. Cl.
CPC ............... *F03G 7/04* (2013.01); *F01D 25/24* (2013.01); *F02C 1/02* (2013.01); *F25J 1/004* (2013.01);
(Continued)

(58) Field of Classification Search
CPC . F01D 25/24; F01D 1/023; F01D 3/02; F03G 7/04; F25J 1/0022; F25J 1/004;
(Continued)

(56) References Cited

U.S. PATENT DOCUMENTS 1,726,104 A * 8/1929 Harris ...................... F02C 3/00
                                                            60/39.15
2,626,501 A * 1/1953 Pavlecka ................... F01D 1/28
                                                            60/39.15

(Continued)

FOREIGN PATENT DOCUMENTS

CN     1037190 A    11/1989
CN     1045843 A    8/1990
(Continued)

OTHER PUBLICATIONS

Supplementary Chinese Search Report, CN Application No. 2014800370967 dated Jan. 3, 2017, 3 pages.
(Continued)

*Primary Examiner* — Carlos A Rivera
*Assistant Examiner* — Adam W Brown
(74) *Attorney, Agent, or Firm* — International IP Law Group, P.L.L.C.

(57) ABSTRACT

An exemplary embodiment of the present techniques provides a system for decreasing a temperature of a fluid. The
(Continued)

system includes an axial flow expander for expanding gas flowed in a direction along an axis thereof. The axial flow expander includes: an outer casing made as a unified structure having an inlet port and an outlet port. An inner casing is fixed inside the outer casing. A rotor shaft is accommodated inside the inner casing, and is aligned with the axis. A number of bearings allow the rotor shaft to rotate around the axis. Moving blades protrude from the rotor shaft and are arranged inside the gas passage in an alternating fashion with a number of stator vanes. The inner casing, the rotor shaft, the bearings, the stator vanes, and the moving blades are integrally assembled, and inserted into the outer casing in the direction along the axis.

31 Claims, 9 Drawing Sheets

(51) Int. Cl.
  *F02C 1/02* (2006.01)
  *F25J 1/00* (2006.01)
  *F25J 1/02* (2006.01)

(52) U.S. Cl.
  CPC ............ *F25J 1/005* (2013.01); *F25J 1/0022* (2013.01); *F25J 1/0042* (2013.01); *F25J 1/0072* (2013.01); *F25J 1/0082* (2013.01); *F25J 1/0205* (2013.01); *F25J 1/025* (2013.01); *F25J 1/0257* (2013.01); *F25J 1/0288* (2013.01); *F05D 2220/62* (2013.01); *F05D 2230/60* (2013.01); *F25J 2230/20* (2013.01); *F25J 2235/60* (2013.01); *F25J 2240/02* (2013.01); *F25J 2240/30* (2013.01)

(58) Field of Classification Search
  CPC F25J 1/0042; F25J 1/005; F25J 1/0072; F25J 1/0082; F25J 1/0288; F25J 1/0257; F25J 1/025; F25J 1/0205; F25J 2230/20; F25J 2235/60; F25J 2240/02; F25J 2240/30; F02C 1/02; F05D 2220/62; F05D 2230/60
  See application file for complete search history.

(56) References Cited

U.S. PATENT DOCUMENTS

| | | | |
|---|---|---|---|
| 2,638,743 A | | 5/1953 | Feilden |
| 2,922,285 A | | 1/1960 | Rae |
| 3,408,045 A | * | 10/1968 | Hart .......................... F01D 3/02 415/103 |
| 3,529,901 A | * | 9/1970 | Hart .......................... F01D 25/26 415/103 |
| 3,657,884 A | * | 4/1972 | Hugoson .................... F01D 3/02 60/39.37 |
| 3,677,019 A | | 7/1972 | Olszewski |
| 3,724,226 A | | 4/1973 | Pachaly |
| 3,817,654 A | * | 6/1974 | Sohma ...................... F01D 3/02 415/103 |
| 4,019,343 A | | 4/1977 | Roberts |
| 4,102,598 A | * | 7/1978 | Stock ....................... F01D 25/26 415/135 |
| 4,638,638 A | | 1/1987 | Marshall et al. |
| 4,758,257 A | | 7/1988 | Gates et al. |
| 4,764,084 A | * | 8/1988 | Parker ....................... F01D 9/048 285/187 |
| 4,863,341 A | | 9/1989 | Groenendaal |
| 4,915,581 A | * | 4/1990 | Groenendaal, Jr. ... F01D 25/007 248/901 |
| 4,948,333 A | | 8/1990 | Meer et al. |
| 5,133,640 A | * | 7/1992 | Groenendaal, Jr. ..... F01D 25/26 415/108 |
| 5,651,269 A | | 7/1997 | Prevost et al. |
| 6,105,389 A | | 8/2000 | Paradowski et al. |
| 6,419,448 B1 | | 7/2002 | Owczarek |
| 6,647,744 B2 | | 11/2003 | Fanning et al. |
| 6,898,949 B2 | | 5/2005 | Paradowski |
| 7,047,764 B2 | | 5/2006 | Sawchuk et al. |
| 7,195,443 B2 | * | 3/2007 | Vandervort ............... F01D 3/02 415/1 |
| 7,404,699 B2 | | 7/2008 | Thamm et al. |
| 7,762,766 B2 | | 7/2010 | Shteyman et al. |
| 7,785,068 B2 | | 8/2010 | Rao et al. |
| 8,240,045 B2 | | 8/2012 | Sutcu et al. |
| 8,414,252 B2 | * | 4/2013 | Rivas ........................ F01D 3/02 415/1 |
| 8,922,093 B2 | * | 12/2014 | Crocker ................... H02K 1/14 310/114 |
| 2003/0005698 A1 | | 1/2003 | Keller |
| 2005/0183452 A1 | | 8/2005 | Hahn et al. |
| 2010/0260599 A1 | | 10/2010 | Yamashita et al. |
| 2012/0107108 A1 | | 5/2012 | Nagao et al. |
| 2013/0160455 A1 | * | 6/2013 | Leconte ................... F01D 1/02 60/772 |

FOREIGN PATENT DOCUMENTS

| | | |
|---|---|---|
| CN | 1057315 A | 12/1991 |
| CN | 101010488 A | 8/2007 |
| CN | 201896664 U | 7/2011 |
| EP | 0672877 A1 | 9/1995 |
| EP | 0959231 A1 | 11/1999 |
| GB | 764501 A | 12/1956 |
| GB | 893452 A | 4/1962 |
| GB | 1135766 A | 12/1968 |
| GB | 2019943 A | 11/1979 |
| JP | A-S55-064105 | 5/1980 |
| JP | A-S62-153503 | 7/1987 |
| JP | A-H04-124410 | 4/1992 |
| JP | A-09-004409 | 1/1997 |
| JP | A-10-089013 | 4/1998 |
| JP | 2003-27901 A | 1/2003 |
| JP | A-2011-043070 | 3/2011 |
| JP | A-2013-053530 | 3/2013 |
| WO | WO2007/021351 A1 | 2/2007 |
| WO | WO2011/135335 A2 | 11/2011 |

OTHER PUBLICATIONS

Supplementary European Search Report, EP Application No. 14818484 dated Jan. 24, 2017, 2 pages.
PCT International Preliminary Report on Patentability, dated Jul. 30, 2015, for PCT Application PCT/US14/44485, Filed Jun. 27, 2014.
PCT International Search Report, dated Nov. 5, 2014, for PCT Application PCT/US14/44485, Filed Jun. 27, 2014.
Written Opinion of the International Search Authority, dated Nov. 5, 2014, for PCT Application PCT/US14/44485, Filed Jun. 27, 2014.
European Search Report, EP Application No. 14817351.1, dated Oct. 14, 2016, 6 pages.
Notice of Allowance, U.S. Appl. No. 14/900,555 dated Mar. 26, 2018, 9 pages.
Japanese Office Action, JP Application No. 2016-524226 dated Apr. 6, 2018, 5 pages.

* cited by examiner

300

400

800

900

1000

SYSTEMS AND METHODS OF UTILIZING AXIAL FLOW EXPANDERS

RELATED APPLICATION

Pursuant to 35 U.S.C. § 371, this application is a United States National Stage Application of International Patent Application No. PCT/US2014/044485, filed on 27 Jun. 2014, which claims the benefit of U.S. Provisional Patent Application Ser. No. 61/840,792, filed 28 Jun. 2013, the contents of which are incorporated by reference as if set forth in their entirety herein.

FIELD

Exemplary embodiments of the present techniques relate to using expander turbines. Specifically, expander turbines are provided herein that have an axial fluid flow relative to a shaft.

BACKGROUND

Large volumes of natural gas (i.e., primarily methane) are located in remote areas of the world. This gas has significant value if it can be economically transported to market. Where the gas reserves are located in reasonable proximity to a market and the terrain between the two locations permits, the gas is typically produced and then transported to market through submerged and/or land-based pipelines. However, when gas is produced in locations where laying a pipeline is infeasible or economically prohibitive, other techniques must be used for getting this gas to market.

A commonly used technique for non-pipeline transport of gas involves liquefying the gas at or near the production site and then transporting the liquefied natural gas to market in specially designed storage tanks aboard transport vessels. The natural gas is cooled and condensed to a liquid state to produce liquefied natural gas ("LNG"). LNG is typically, but not always, transported at substantially atmospheric pressure and at temperatures of about −162° C. (−260° F.), thereby significantly increasing the amount of gas which can be stored in a particular storage tank on a transport vessel. For example, LNG takes about 1/600 of the volume of natural gas in the gas phase.

Once an LNG transport vessel reaches its destination, the LNG is typically off-loaded into other storage tanks from which the LNG can then be revaporized as needed and transported as a gas to end users through pipelines or the like. LNG has been an increasingly popular transportation method to supply major energy-consuming nations with natural gas.

The liquefaction process may have a number of stages during which the natural gas is cooled and liquefied. During the cooling process, the pressure is lowered, with the shipping pressure of the liquefied product being near atmospheric (for example, about 3.6 psig or less). The decrease in pressure assists in cooling the natural gas during the liquefaction process by decreasing the enthalpy of the natural gas. Refrigeration equipment is also used for removing heat energy. One stage of this process requires that the high-pressure natural gas stream be reduced in pressure sufficiently to assist in the production of extremely cold LNG (or subcooled LNG) by extracting energy (or enthalpy) from a liquid natural gas stream.

Pressure drop in a hydraulic turbine can often be used in LNG processes to remove energy from refrigerant streams and natural gas streams, or other systems, to obtain lower temperatures. The energy removed from these streams may also be used to generate electrical power. For example, turbines can be coupled with a generator to provide the braking load necessary to remove the energy. The generator may be coupled to the facility power grid, wherein the additional power improves the thermodynamic efficiency of the process. In LNG processes, the efficiency improvement may be about 1 to 2%, resulting in saving many Megawatt-hours per year and improving economic justification of the liquefaction process.

Other parties have proposed the concept of applying turbines in series to satisfy the need for high pressure let down at a magnitude greater than typically performed in existing facilities. Examples of series expansion are considered in patents related to air separation, as well as in cascade LNG liquefaction processes, among others.

U.S. Pat. No. 3,724,226 to Pachaly discloses an LNG expander cycle process employing integrated cryogenic purification. In the process, a work-expanded refrigerant portion undergoes a compression cycle and is work expanded through a series of expansion turbines. The expansion turbines furnish at least part of the power necessary to drive the compressor system in the refrigerant gas cycle, by sharing a common shaft or other mechanical coupling with the compressors. The expanders used are turbo-expanders, which can liquefy a portion of a high-pressure gas stream as it is depressurized through the turbo expanders. The expanded stream can then be flowed through cooling units to remove more energy, prior to flowing through more turbo-expanders.

U.S. Pat. No. 4,019,343 to Roberts discloses a refrigeration system using enthalpy converting liquid turbines. The refrigeration system uses a series of liquid turbines, each of which have an associated compressor. A stream of liquid ammonia is allowed to expand in a liquid turbine, during which a portion of the liquid flashes and is sent to the associated compressor. The cooled, expanded liquid flows to the next turbine in the series, where the process is repeated.

Related information may be found in U.S. Pat. Nos. 2,922,285; 3,677,019; 4,638,638; 4,758,257; 5,651,269; 6,105,389; 6,647,744; 6,898,949; and 7,047,764. Further information may also be found in United States Patent Application Publication Nos. 2003/0005698 and 2005/0183452. Additional information may be found in International Patent Application Publication No. WO 2007/021351 and European Patent Application Publication No. 0 672 877 A1.

Current turbine expanders are centrifugal expanders that have a series of blades forming a triangular shape over a central shaft forming an impeller. A high pressure stream enters from a port over the tip of the blades at the outer diameter of the impeller, flowing radially inward, rotates the impeller, turning the shaft, and a lower pressure stream exits through an outlet from the center of the shaft flowing out axially from the impeller. Each expander generally has a single expander impeller. Thus, these turbine expanders have a relative small flow rate and pressure drop. Accordingly, there is a need for a plurality of the centrifugal expanders when generating liquefied gas in a large facility. For this reason, centrifugal expanders are not preferred for use in large plants due to increased costs, increased space requirements, and maintenance characteristics that are complicated by the increased amount of machinery. The efficiency of centrifugal expanders is generally also limited to about the low eighty percent level. Furthermore, an axial expander can provide higher efficiency resulting in more liquids or sub-cooling of the fluid for the same pressure drop which can be very valuable in gas liquefaction and gas separation processes. Further, axial turbines have been developed extensively as steam turbines but have very limited application for gas expanders.

For example, Japanese Patent Publication No. 2003-27901 by Ono et al. (hereinafter "the Ono patent"), discloses an axial flow expander. The axial flow expander is provided with a turbine stage configured from a stationary blade affixed to a stationary body and a moving blade affixed to a turbine rotor. A working fluid flow path, having a plurality of turbine stages, is aligned in the axial direction of the turbine. A bypass flow path is provided outside the working fluid flow path to allow part of the working fluid flowing in from the upstream side in the flow direction of the working fluid to bypass the outer peripheral side of at least one of the turbine stages and to be introduced into a turbine stage located on the downstream side in the flow direction of the working fluid from the bypassed turbine stage.

However, it is often necessary for the rotary machine to be available to remove the inner components from a casing for servicing. The axial flow expander disclosed in the Ono patent does not provide such a structure for removing the inner components from the casing. In fact, the fixed structures inside the flow path prevent removal without a structure for opening the case. To allow for assembly and servicing the Ono patent allows the casing to be divided into two parts in a horizontal plane. However, the dividing structure of the case may lower the pressure that can be retained by the turbine expander. In an expander used in a refrigeration cycle, or for process gas cooling the inside of the casing is subject to high-pressure. For this reason, there may be a leak of the gas from the division surface.

Accordingly, there is a need for an axial flow expander that is capable of increasing flow rates, increased pressure drop, higher efficiency and sealing in high pressure gases.

SUMMARY

An exemplary embodiment of the present techniques provides a system for decreasing a temperature of a fluid. The system includes an axial flow expander for expanding gas flowed in a direction along an axis thereof. The axial flow expander includes: an outer casing centered around the axis, wherein the outer casing is a unified structure having an inlet port and an outlet port; an inner casing centered around the axis, fixed inside the outer casing, wherein the inner casing has a gas passage configured to allow gas to enter the inner casing from the inlet port of the outer casing and exit the inner casing to the outlet port of the outer casing. A rotor shaft is accommodated inside the inner casing, and of which an axial center is aligned with the axis. A number of bearings are fixed to the inner casing, wherein the bearings are configured to allow the rotor shaft to rotate around the axis with respect to the inner casing. A number of stator vanes are fixed to the inner casing so as to protrude inward from an inner surface of the inner casing, wherein the stator vanes are arranged inside the gas passage so as to be separated at intervals in the direction of the axis. A number of moving blades are fixed to the rotor shaft so as to protrude outward from the rotor shaft, and are arranged inside the gas passage so as to be alternating with the stator vanes. The inner casing, the rotor shaft, the bearing, the stator vanes, and the moving blades are integrally assembled, and the assembled members are inserted into the outer casing in the direction along the axis.

Another exemplary embodiment of the present techniques provides a method for cooling a fluid in an axial flow expander. The method includes flowing a high-pressure fluid into the axial flow expander, wherein the axial flow expander includes an outer casing centered around the axis. The outer casing is a unified structure having an inlet port and an outlet port. The axial flow expander also has an inner casing centered around the axis, fixed inside the outer casing, wherein the inner casing has a gas passage configured to allow gas to enter the inner casing from the inlet port of the outer casing and exit the inner casing to the outlet port of the outer casing. A rotor shaft is accommodated inside the inner casing, and of which an axial center is aligned with the axis. A number of bearings are fixed to the inner casing, wherein the bearings are configured to allow the rotor shaft to rotate around the axis with respect to the inner casing. A number of stator vanes are fixed to the inner casing so as to protrude inward from an inner surface of the inner casing, wherein the stator vanes are arranged inside the gas passage so as to be separated at intervals in the direction of the axis. A number of moving blades are fixed to the rotor shaft so as to protrude outward from the rotor shaft, and are arranged inside the gas passage so as to be alternating with the stator vanes. The inner casing, the rotor shaft, the bearing, the stator vanes, and the moving blades are integrally assembled, and the assembled members are inserted into the outer casing in the direction along the axis. The method also includes expanding the fluid in the axial flow expander to turn the rotor shaft. Energy is removed from the fluid through imparting mechanical energy into the rotor shaft coupled to a mechanical device. The cooled fluid is flowed into a downstream process unit.

Another exemplary embodiment provides a liquefied natural gas (LNG) plant that includes a gas treatment plant configured to remove impurities from a raw natural gas feed to form a treated natural gas, wherein the treated natural gas is flowed into a chiller system; and the chiller system includes an axial flow expander for expanding gas flowed in a direction along an axis thereof. The axial flow expander includes an outer casing centered around the axis. The outer casing is a unified structure having an inlet port and an outlet port. The axial flow expander also has an inner casing centered around the axis, fixed inside the outer casing, wherein the inner casing has a gas passage configured to allow gas to enter the inner casing from the inlet port of the outer casing and exit the inner casing to the outlet port of the outer casing. A rotor shaft is accommodated inside the inner casing, and of which an axial center is aligned with the axis. A number of bearings are fixed to the inner casing, wherein the bearings are configured to allow the rotor shaft to rotate around the axis with respect to the inner casing. A number of stator vanes are fixed to the inner casing so as to protrude inward from an inner surface of the inner casing, wherein the stator vanes are arranged inside the gas passage so as to be separated at intervals in the direction of the axis. A number of moving blades are fixed to the rotor shaft so as to protrude outward from the rotor shaft, and are arranged inside the gas passage so as to be alternating with the stator vanes. The inner casing, the rotor shaft, the bearing, the stator vanes, and the moving blades are integrally assembled, and the assembled members are inserted into the outer casing in the direction along the axis.

DESCRIPTION OF THE DRAWINGS

The advantages of the present techniques are better understood by referring to the following detailed description and the attached drawings, in which.

DETAILED DESCRIPTION

Figure 1:
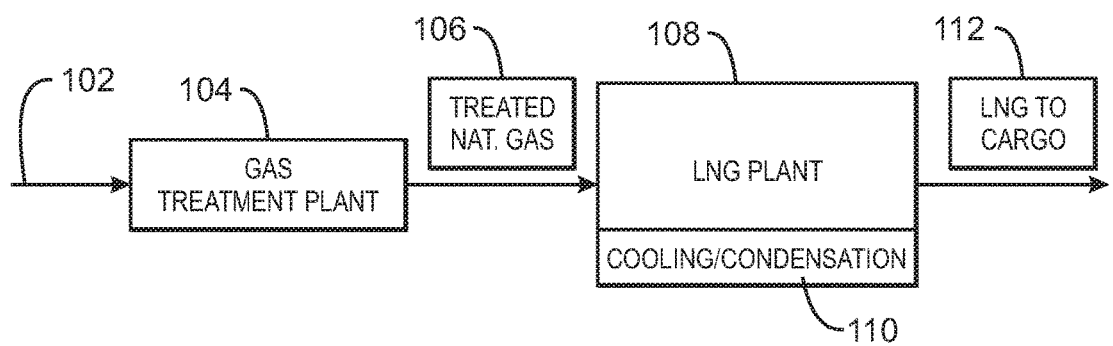
FIG. 1 is a block diagram of a liquefied natural gas (LNG) plant.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, a "compressor" includes any type of equipment designed to increase the pressure of a material, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example.

"Cryogenic temperature" refers to a temperature that is about −50° C. or below.

"Expansion device" refers to one or more devices suitable for reducing the pressure of a fluid in a line (for example, a liquid stream, a vapor stream, or a multiphase stream containing both liquid and vapor). Unless a particular type of expansion device is specifically stated, the expansion may be performed at least partially by isenthalpic means, may be performed at least partially by isentropic means, or may be performed by a combination of both isentropic means and isenthalpic means. Suitable devices for isenthalpic expansion of natural gas and other fluids are known in the art and generally include, but are not limited to, manually or automatically actuated throttling devices such as, for example, valves, control valves, Joule-Thomson (J-T) valves, or venturi devices. Suitable devices for isentropic expansion of natural gas are known in the art. Generally, they include equipment such as expanders or turbo expanders that extract or derive work from such expansion. Suitable devices for isentropic expansion of liquid streams are known in the art. Generally, they include equipment such as expanders, hydraulic expanders, expander turbines, or turbo expanders that extract or derive work from such expansion. An example of a combination of both isentropic means and isenthalpic means may be a Joule-Thomson valve and a turbo expander in parallel, which provides the capability of using either alone or using both the J-T valve and the turbo expander simultaneously. Isenthalpic or isentropic expansion can be conducted in the all-liquid phase, all-vapor phase, or mixed phases, and can be conducted to facilitate a phase change from a vapor stream or liquid stream to a multiphase stream (a stream having both vapor and liquid phases). In the description of the drawings herein, the reference to more than one expansion device in any drawing does not necessarily mean that each expansion device is the same type or size.

"Expansion-type cooling" refers to cooling which occurs when the pressure of a fluid or two-phase system is decreased by passage through a pressure reduction means. In one embodiment, the expansion means is a Joule-Thompson expansion valve. In another embodiment of the present invention, the expansion means is a hydraulic or gas expander, such as a turbo-expander. In a turbine, the cooling removes energy from the stream as mechanical energy.

As used herein, "fluid" refers to a compressible phase material. The fluid can include a gas or a supercritical fluid. The fluid may include some liquid phase material in addition to the compressible phase, either after or before expansion through an expander.

As used herein, a "heat exchange unit" includes any one type or combination of similar or different types of equipment known in the art for facilitating heat transfer. Thus, a heat exchange unit may be a single piece of equipment, or it may comprise equipment contained in a plurality of equipment pieces. Conversely, multiple heat exchange units may be contained in a single piece of equipment, for example, a cooling box containing multiple heat exchangers.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

"Liquefied natural gas" or "LNG" is natural fluid 502 generally known to include a high percentage of methane, but also other elements and/or compounds. The other elements or compounds may include, but are not limited to, ethane, propane, butane, carbon dioxide, nitrogen, helium, hydrogen sulfide, or combinations thereof) that has been processed to remove one or more components (for instance, helium) or impurities (for instance, water and/or heavy hydrocarbons) and then condensed into a liquid at almost atmospheric pressure by cooling.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas may often contain ethane ($C_2$), higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Sour gas" generally refers to natural gas containing sour species such as hydrogen sulfide ($H_2S$) and carbon dioxide ($CO_2$). When the $H_2S$ and $CO_2$ have been removed from the natural gas feedstream, the gas is classified as "sweet." The term "sour gas" is applied to natural gases including $H_2S$ because of the odor that is emitted even at low concentrations from an unsweetened gas.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

Overview

In embodiments described herein, an axial flow expander is provided for use in cooling fluids. The axial flow expander can provide a higher flow than a centrifugal expander, allowing the use of fewer turbines in a plant for an equivalent production, for example, of liquefied natural gas, refrigerant, or cooled gas streams, among others. Further, the design described herein has a unitary case, allowing the turbine to be slid into the flow path through a port along the axis. In contrast to split case designs, a unitary case design may increase potential operating pressures that can be used without leakage of fluids.

In an axial flow expander a height dimension of a moving blade increases with increasing flow rates, which can cause a problematic amount of thrust force. Thus, in some embodiments, problems from the trust force are mitigated by using a double-flow type structure in which the fluid stream flows through turbines on each side of the inlet, cancelling the trust force. The axial flow expander also allows equipment to be attached to the shaft on each side of the turbine, as the shaft is not blocked by an inlet port at one end. The use of equipment at each end of the shaft provides load balancing, mitigating thrust effects from downstream equipment.

The axial flow expander described herein may be used in any number of cooling applications. For example, the axial flow expander could be used for cooling of a gas stream, such as in a refrigeration application. In another application, the axial flow expander could be used for gas cooling and liquids removal, for example, to produce LNG.

The mechanical energy removed during the expansion and cooling process could be used to power other equipment, such as compressors, generators, and the like. Although an exemplary LNG plant is discussed herein, it can be understood that this is merely one application of the axial flow expander.

FIG. 1 is a block diagram of a liquefied natural gas (LNG) plant. As shown in FIG. 1, a raw gas feed 102 can be processed in a gas treatment plant 104. The gas treatment plant 104 may remove acid gases (such as $CO_2$ and $H_2S$), as well as water, heavier hydrocarbons (such as ethane, ethylene, $C_3$ isomers, and higher carbon compounds), and other impurities. The treated natural gas 106 is cooled and liquefied in a LNG Plant 108. A portion of the treated gas 106 may be combusted in gas turbines to power the LNG Plant 108, for example, driving refrigerant compressors in a cooling/condensation section 110 of the LNG plant 108. After the LNG 112 is produced, it is transferred to a cargo loading point, where it may be loaded into ships or other LNG transport vessels to be carried to an energy consuming location, as noted above. The cooling/condensation section 110 of the LNG plant 108 is discussed in detail in FIG. 2.

Figure 2:
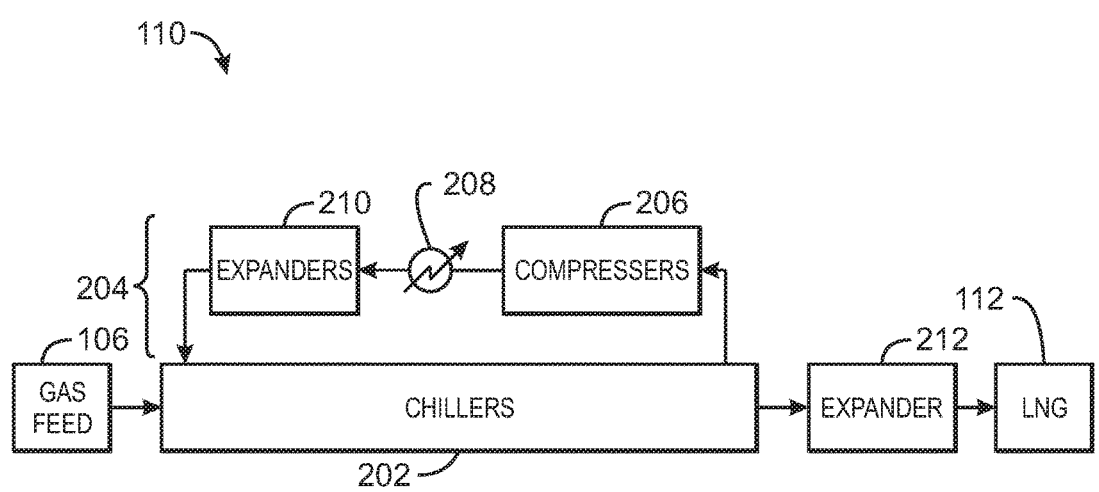
FIG. 2 is a block diagram of the cooling/condensation section of an LNG plant.

FIG. 2 is a block diagram of a cooling/condensation section 110 of an LNG plant 108 (FIG. 1). In the cooling/condensation section 110, the treated gas feed 106 may be passed through one or more chillers 202 to remove energy and condense the gas. The chillers 202 may be cooled by one or more refrigerant systems 204, which may include compressors 206, coolers 208, and expanders 210. The expanders 210 provide a pressure let down which can remove energy from the refrigerant. A pressure let down is described as reducing the pressure of the fluid from a higher pressure ($P_1$) to a lower pressure ($P_2$). This can be used to reduce the energy of the refrigerant prior to flowing the refrigerant through the chillers 202. In an exemplary embodiment, the refrigerant expanders 210 may include axial flow expanders, which can be coupled to electrical generators to provide a braking load. Thus, electrical power can be generated using energy removed from the fluid streams by the axial flow expanders. The axial flow expanders can be coupled to compressors instead of, or in addition to, generators, providing compression service for example, for use in compressing refrigerant gases. Further, axial flow expanders can be used directly in the LNG production stream, to cool the high pressure natural gas while decreasing the pressure.

Once the LNG is nearly completely liquefied, a final LNG expander 212 may be used to provide a pressure let down to lower the pressure of any remaining gas in the LNG stream and further reduce its energy. The LNG expander 212 may be of the same type as described for the refrigerant expander 210. In an exemplary embodiment of the present techniques, one or more axial flow expanders can be used, for example, in a series or in series-parallel arrangement, to achieve pressure let down in an LNG process. Any number of LNG plant technologies may use exemplary embodiments of the present techniques, such as the LNG plant configuration illustrated in FIG. 3.

Figure 3:
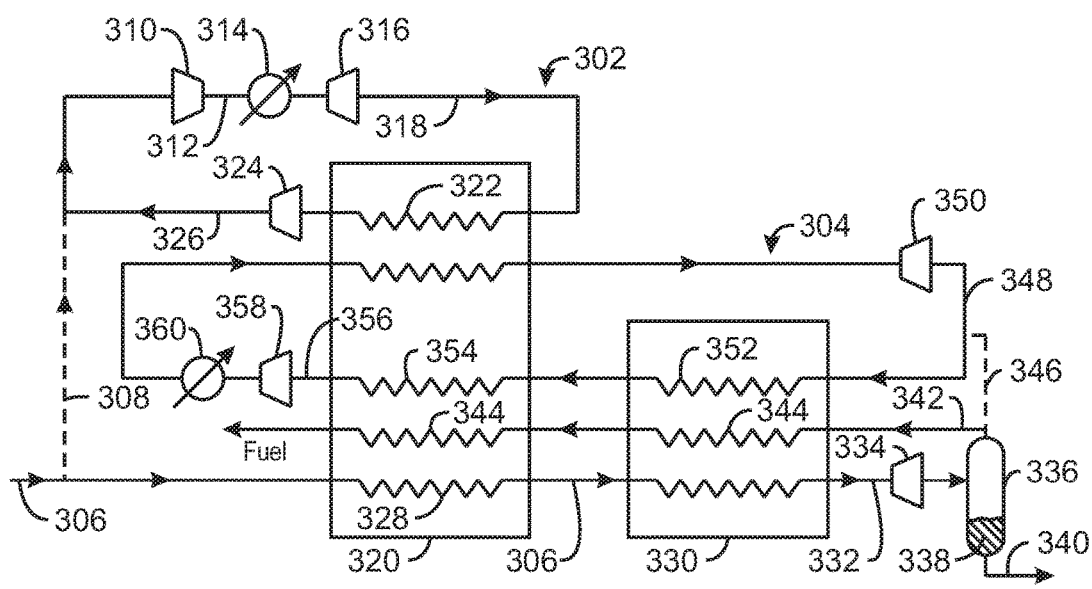
FIG. 3 illustrates a LNG plant in which an expander loop (i.e., an expander cycle) and a sub-cooling loop may use multiple expander turbines to produce electricity while removing energy.

FIG. 3 illustrates a LNG plant 300 in which an expander loop 302 (i.e., an expander cycle) and a sub-cooling loop 304 may use axial flow expanders to produce electricity while removing energy from refrigerants and a feed gas stream 306. As used herein, the terms "loop" and "cycle" are used interchangeably. In FIG. 3, the feed gas stream 306 enters the liquefaction process at a pressure less than about 1200 psia. The feed gas stream 306 may be at lower pressures, for example, less than about 600 psia. Typically, the pressure of feed gas stream 306 can be about 800 psia. Feed gas stream 306 may include natural gas that has been treated to remove contaminants, such as a treated natural gas stream 106 (FIG. 1).

A portion of the feed gas stream 306 may be withdrawn to form a side stream 308, to provide a refrigerant for expander loop 302. However, if natural gas is used as a refrigerant in the expander loop 302, it may be withdrawn from any number of other locations in the process, including after the feed gas has been passed to a heat exchange area. The side stream 308 can be passed to a compressor 310 where it may be compressed to a pressure greater than about 1500 psia, providing a compressed refrigerant stream 312. The pressure is not limited to 1500 psia, as any pressure may be used. For example, the compressed refrigerant stream 312 may be at a pressure greater than about 2500 psia, or even greater.

After exiting the compressor 310, the compressed refrigerant stream 312 may flow through a cooler 314 where it can be cooled by indirect heat exchange with a suitable cooling fluid to provide a compressed, cooled refrigerant stream. The cooler 314 may use water or air as the cooling fluid, although any type of cooling fluid can be used. The temperature of the compressed refrigerant stream 312 as it emerges from cooler 314 depends on the ambient conditions and the cooling medium used and may be about 35° F. to about 105° F. The cooled compressed refrigerant stream 312 can then pass to an expander 316 where it can be expanded and cooled to form an expanded refrigerant stream 318. In exemplary embodiments of the present techniques, the expander 316 includes one or more axial flow expanders, as discussed in further detail below. The axial flow expanders can be used to provide at least a portion of the energy used to drive the compressor 310.

The expanded refrigerant stream 318 may flow to a first heat exchange unit 320 to provide at least part of the refrigeration duty for the first heat exchange unit 320. In the first heat exchange unit 320, the expanded refrigerant stream 318 may be passed through a heat exchanger 322. In some embodiments, the expanded refrigerant stream 318 may be flashed in the heat exchanger 322 to provide greater cooling.

Upon exiting the first heat exchange unit 320, the expanded refrigerant stream 318 can be fed to a compressor 324. In the compressor 324, the expanded refrigerant stream 318 is compressed to form a compressed stream 326, which can then be joined with the side stream 308. Once the expander loop 302 has been filled with the feed gas 306 from the side stream 308, only a small amount of feed gas 306 may be used to replace losses from leaks. Thus, the majority of the gas entering the compressor 310 will generally be provided by the compressed stream 326. The portion of the feed gas stream 306 that is not withdrawn as side stream 308 is passed to the heat exchange unit 320 where it may be cooled, at least in part, by indirect heat exchange with expanded refrigerant stream 318, for example, by flowing through a heat exchanger 328.

After exiting the first heat exchange unit 320, the feed gas stream 306 can pass through a second heat exchange unit 330. The second heat exchange unit 330 can be used to sub-cool the feed gas stream 306, for example, by indirect heat exchange with the sub-cooling loop 304, to produce a sub-cooled stream 332. The sub-cooled stream 332 may be expanded to a lower pressure in a second expander 334, thereby partially liquefying sub-cooled stream 332 to form a liquid fraction and a remaining vapor fraction. In an exemplary embodiment of the present techniques, the second expander 334 includes one or more axial flow expanders, for example, in a series or series-parallel arrangement, to generate electricity, as discussed in further detail below.

The cooled sub-cooled stream 332 can be passed to surge tank 336 where a liquefied fraction 338 is withdrawn from the process as a LNG stream 340 having a temperature corresponding to the bubble point pressure. The remaining vapor fraction may include both natural gas and any nitrogen remaining in the sub-cooled stream 332. The vapor fraction stream 342 may be used as fuel to power the compressors, for example, being combusted in gas turbine engines to drive compressor strings. Prior to being used as fuel, all or a portion of the flash vapor stream 342 may be passed from the surge tank 336 through heat exchangers 344 in the heat exchange units 330 and 320 to supplement the cooling provided by the refrigerants.

A portion of the flash vapor 342 may be withdrawn through a line 346 to act as a refrigerant in sub-cooling loop 304. Once sub-cooling loop 304 is fully charged with gas, only make-up gas (i.e., additional flash vapor from line 346) may be added to replace losses from leaks. In sub-cooling loop 304, an expanded stream 348 can be discharged from a third expander 350 and passed through a heat exchanger 352 in the second heat exchange unit 330 and a second heat exchanger 354 in the first heat exchange unit 320. As the expanded stream 348 passes through the heat exchange units 330 and 320, it can be flashed into a vapor stream 356. The vapor stream 356 can be fed to a compressor 358, in which it is re-compressed to a higher pressure. After exiting the compressor 358, the re-compressed sub-cooling refrigerant stream can be passed through a second cooler 360 to remove heat from the compression. The second cooler 360 may be of the same type as cooler 314, although any type of cooler may be used. After cooling, the re-compressed sub-cooling refrigerant stream is passed to the first heat exchange unit 320, where it may be further cooled by indirect heat exchange with expanded refrigerant stream 318, sub-cooling refrigerant stream 348, and flash vapor stream 342. After exiting the first heat exchange unit 320, the re-compressed and cooled sub-cooling refrigerant stream can be expanded through an expander 350 to provide the expanded stream 348, which may then be used to repeat the cycle.

The techniques described herein are not limited to the configuration shown in the exemplary embodiment illustrated in FIG. 3, as any number of processes may use the axial flow expanders described herein, both for the LNG liquefaction process, and for refrigerant duty. Such processes may include the LNG production processes C3MR and APCI from AirProducts, the cascade LNG process from ConocoPhillips, the Shell DMR LNG process, and LNG production processes from Linde. As mentioned herein, other processes may also use the axial flow expanders, including cryogenic air.

Standard Expander Turbines

Figure 4:
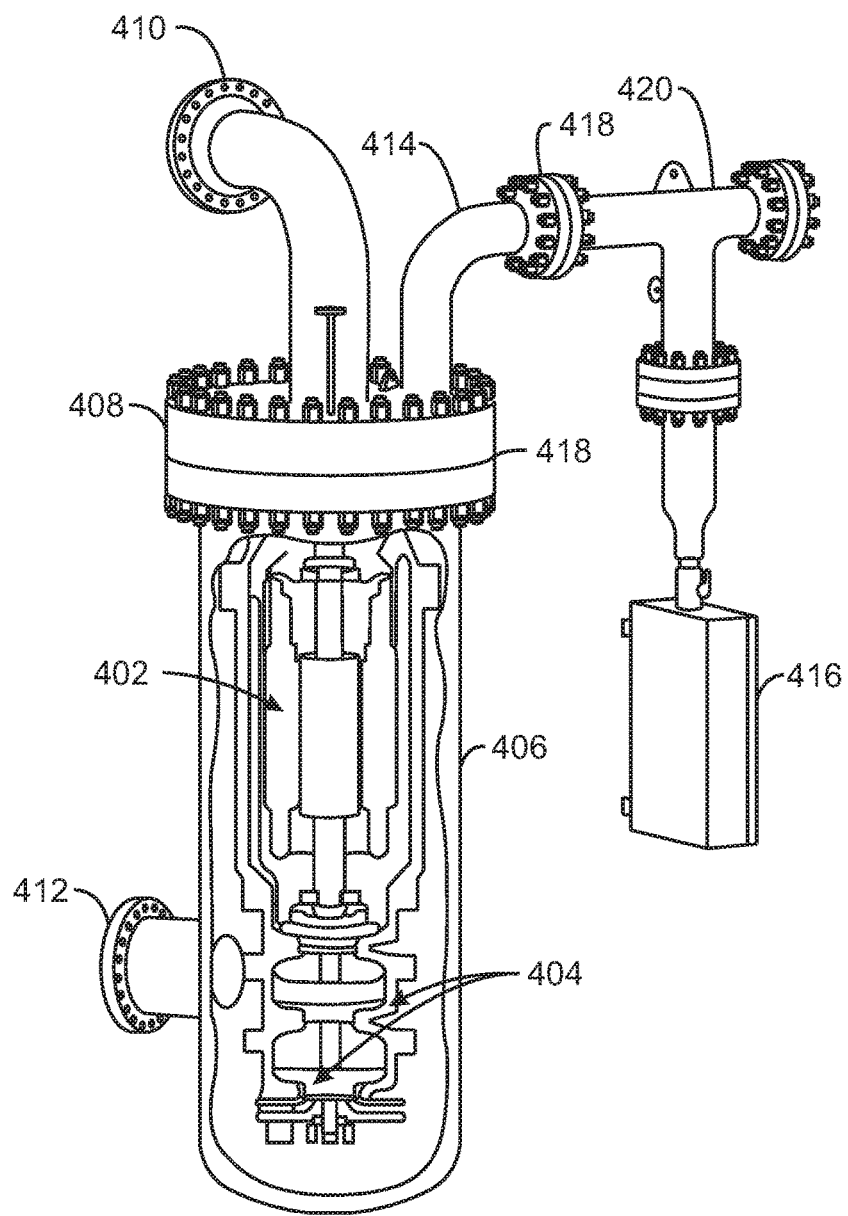
FIG. 4 is a schematic diagram of a expander turbine generator based on a centrifugal expander.

FIG. 4 is an illustration of a canned expander turbine/generator 400. As shown in FIG. 4, both the generator 402 and the expander turbine 404 are located inside a single vessel 406. The vessel 406 has a head 408 that couples to a fluid inlet 410. From the fluid inlet 410, the process fluid (such as LNG or a refrigerant) can flow through the vessel 406, around the generator 402, and through the wheels of the expander turbine 404. The process fluid then exits the vessel through a fluid outlet 412. Power from the generator 402 is removed through electrical lines that exit the head 408 through a generator power conduit 414 and electrical power feed through 416. This configuration is advantageous for the elimination of a seal around a moving part, such as the shaft coupling the generator 402 and the expander turbine 404. Such seals may be less reliable than flanges 418 that are used to seal a head 408 to a vessel 406 or a pipe segment, such as conduit 414, to another pipe segment 420. The canned expander turbine/generator 400 shown in FIG. 4 may be commercially available from Ebarra Corporation. However, the canned expander turbine/generator 400 may only be available in limited power configurations, for example, 2.4 MW or less. Therefore, a series configuration may be used to obtain sufficient capacity, such as three, four, five, six, seven, or more units in series. Further, current techniques for sparing units in place in case of unit failures often use a spare for each installed unit, at a substantial cost. In comparison, the systems described herein may have higher flow capacity, requiring fewer units to achieve the same total capacity.

Axial Flow Expanders

Figure 5:
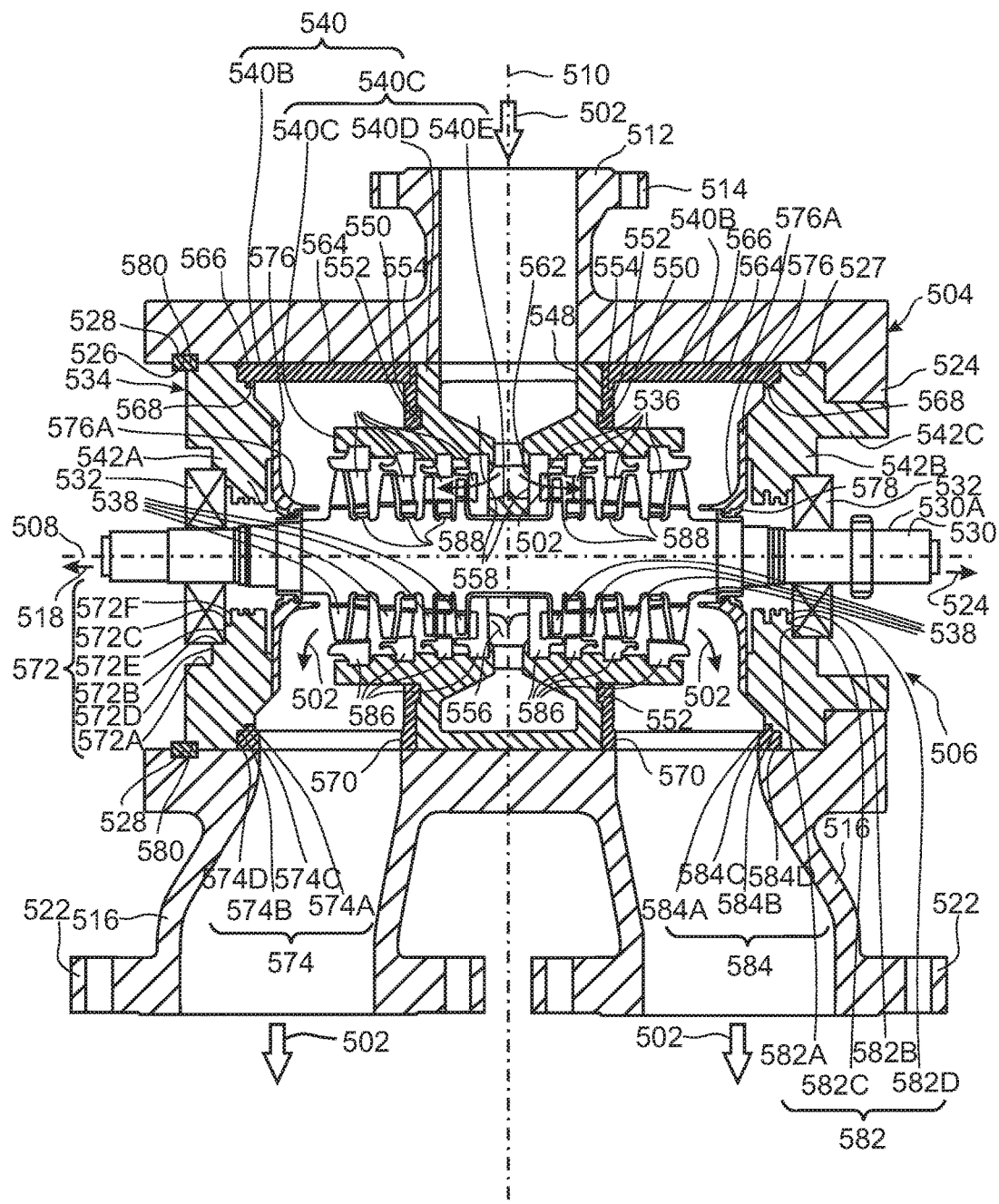
FIG. 5 is a cross section view of an axial flow expander.
Figure 6:
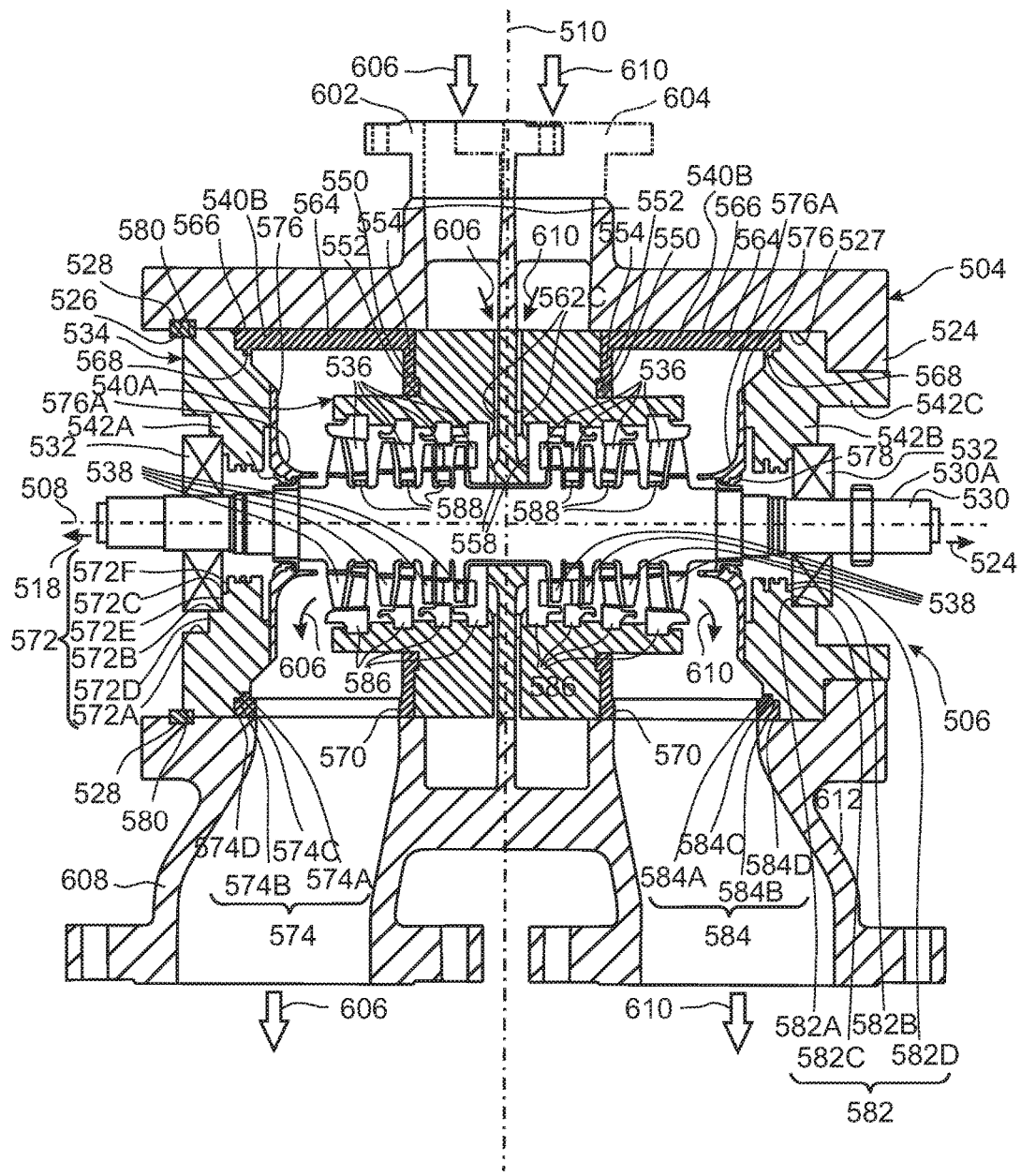
FIG. 6 is a cross section view of another axial flow expander.
Figure 7:
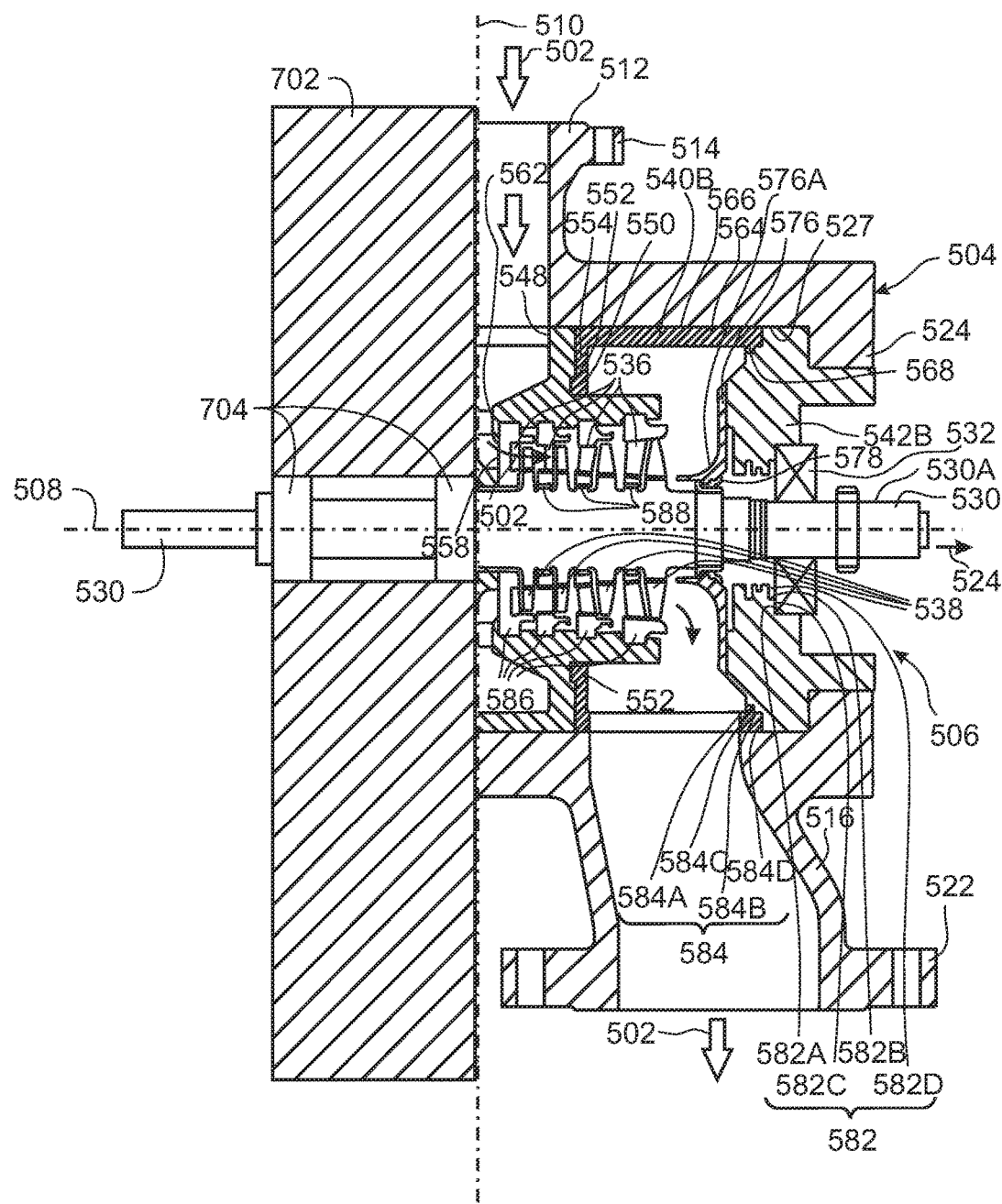
FIG. 7 is a cross section view of yet another axial flow expander.

Exemplary designs for axial flow expanders are discussed with respect to FIGS. 5-7. However, while specific design details are discussed, the axial flow expanders are not limited to the specific details shown. Seals, bearings, and other systems and devices used may be selected based on the service needed. Generally, the axial flow expanders described herein have a unified case into which a rotor assembly structure may be axially inserted. The unified case structure eliminates potential leakage sites that may occur at the joint between each half of the case in a split case design, allowing use of the turbine under conditions that may lead the split case designs to leak.

FIG. 5 is a cross section view of an axial flow expander 500. As noted above, the axial flow expander 500 is configured for use as an expander for a refrigeration cycle, for gas cooling, and for liquid recovery, by allowing the substantially isoentropic expansion of a fluid 502.

The axial flow expander 500 includes a cylindrical formed outer casing 504, and a rotor assembly 506 that can be inserted into the outer casing 504. The outer casing 504 is a cylindrical body centered around an axis 508. In the embodiment shown in FIG. 1, the axial flow expander 500 is formed so as to be substantially symmetrical with respect to a hypothetical line 510 perpendicular to the axis 508 at a central position of the cylindrical body along the axis 508 direction. In addition, the outer casing 504 has an inlet port 512 formed so as to protrude in a radial direction of the outer casing 504 at the central position where the hypothetical line 510 is drawn.

The inlet port 512 is provided with a through-hole passing in the radial direction, wherein the fluid 502 can be introduced into the outer casing 504 via the inlet port 512. Furthermore, the inlet port 512 is provided with a flange portion 514 having a great outer diameter at the outer end of the inlet port 512 in the radial direction. The inlet port 512 can be connected to an inlet duct (not show) via a flange portion 514.

In addition, the outer casing 504 is provided with two outlet ports 516 which are located at an opposite side of the inlet port 512 with respect to the axis 508 so as to protrude in the radial direction of the outer casing 504, wherein one of the outlet ports 516 may be positioned close to one end 518 of the outer casing 504 in the direction of the axis 508, and the other of the outlet ports 516 may be positioned close to the other end 520 of the outer casing 504. Other configurations may be used. For example, the two ports could feed a single outlet manifold built into the case. Each of the outlet ports 516 allows the fluid 502 to exit the outer casing 504. In addition, a flange portion 522 is provided at an outside end portion in the radial direction of the outlet port 516, wherein the flange portion is formed such that an outer diameter of the flange portion 522 close to the outer circumferential surface of the outer casing 504 is enlarged. The outlet port 516 can be connected to an outlet duct (not shown in FIG. 1) via the flange portion 522.

The outer casing 504 is provided with a projection 524 annularly projecting inward in the radial direction in one end 520 of the other end 520 in the direction of the axis 508. The projection 524 is engaged with the rotor assembly 506 when inserting the rotor assembly 506 into the casing 504 from one end 518 of the outer casing 504, and restricts the projection of the outer casing 504 from the other end 520 to the outside of the outer casing 504. That is, the rotor assembly 506 can be inserted into the outer casing 504 only from one end 518 of the outer casing 504.

A recessed portion 526 of the outer casing 504 annularly dented outward in the radial direction is formed at a position close to one end 518 of an inner surface of the outer casing 504. A restriction ring 528 is fitted to the recessed portion 526 of the outer casing 504.

Rotor Assembly

The rotor assembly 506 includes a rotor shaft 530, a pair of bearings 532 that bears the rotor shaft 530, and an inner casing 534 that covers the rotor shaft 530 and to which the bearings 532 are fixed. The rotor assembly 506 is provided with a row of stator vanes 536 disposed inside the inner casing 534, and a row of moving blades 538 formed on the rotor shaft 530 so as to be adjacent to the row of stator vanes 536 in the direction along the axis 508.

The rotor shaft 530 is formed as a rod shape centered around the axis 508, and extends in the direction along the axis 508. In addition, in this embodiment, the rotor shaft 530 is formed so as to be symmetrical with respect to the hypothetical line 510 in the direction of the axis 508.

The bearings 532 are respectively provided at the positions of one end 518 and the other end 520 in the axial 508 direction, and are fixed to the inner casing 534 so as to hold the rotor shaft 530 and allow it to rotate around the axis 508. The bearings 532 can include any number of types of bearing, depending on the service, such as oil lubricated bearings, air bearings, oil bearings, roller bearings, and the like. In some embodiments, such as the sealed operation described with respect to FIG. 9, magnetic bearings can be used. In some applications, such as when downstream equipment is attached to only on end of the rotor shaft 530, thrust bearings may be used to compensate for thrust forces The bearings 532 may be thrust bearings used to compensate for thrust or torque from downstream units attached to the shaft, or from single sided units, as discussed with respect to FIG. 7.

The inner casing 534 is formed as a cylindrical shape centered around the axis 508, and covers the rotor shaft 530. The inner casing 534 is provided with an inner casing body 540 centered along the axis 508. Head members 542 each fixed to one end 518 and the other end 520 in the direction of the axis 508 of the inner casing body 540. The inner casing 534 is formed as a substantial cylindrical shape and defines an inner space 544 within the outer casing 504.

The inner casing body 540 is provided with a partition housing 540A placed at the central position in the direction of the axis 508, and first and second outlet portion casings (connection portions) 540B. The first outlet portion casing 540B is placed between the partition housing 540A and one of the head members 542, such as first head member 542A, and the second outlet portion casing 540B is placed between the partition housing 540A and the other of the head members 542, such as second head member 542B.

The partition housing 540A is provided with a cylindrical portion 540C formed as a substantially cylindrical shape and which extends in the direction of the axis 508, an outer annular portion 540D which annularly protrudes outward in the radial direction from the cylindrical portion 540C in which an outer diameter thereof is formed larger than that of the cylindrical portion 540C, and an inner annular portion 540E which annularly protrudes inward in the radial direction from the cylindrical portion 540C and in which an inner diameter thereof is formed smaller than that of the cylindrical portion 540C.

The outer annular portion 540D is engaged with the inner surface of the outer casing 504, and a first annular space 546 centered around the axis 508 is formed in the circumferential direction of the outer casing 504. The outer annular portion 540D is provided with a first communication portion 548 as a through-hole passing in the radial direction so that the first annular space 546 communicates with the inlet port 512 in the outer casing 504.

In addition, groove portions 550 annularly dented around the cylindrical portion 540C are respectively formed on both side surfaces of the outer annular portion 540D facing in the opposite direction of the axis 508. First projections (projections) 552 of annular fixtures 554 are fitted to the groove portions 550.

The inner annular portion 540E protrudes toward the rotor shaft 530 from the cylindrical portion 540C, and the dimension thereof in the direction of the axis 508 is smaller than that of the outer annular portion 540D. A circumferential inside surface of the inner annular portion 540E is formed so as to face the rotor shaft 530, and a second annular space 556 centered around the axis 508 is formed in the inner annular portion 540E. In addition, the inner annular portion 540E is provided with openings 558 through which the second annular space 556 communicates with a space between the rotor shaft 530 and the cylindrical portion 540C.

Some of the rows of stator vanes 536 are fixed to the inside surface of the cylindrical portion 540C close to one end 518 of the outer casing 504 so that the vanes protrude inward from the inner circumferential surface 560 of the cylindrical portion 540C. The remaining of the rows of stator vanes 536 are fixed to the inside surface of the cylindrical portion 540C close to the other end 520 of the outer casing 504 so that the vanes protrude inward from the inner circumferential surface 560. In addition, a third communication portion 562 which passes in the radial direction and through which the first annular space 546 and the second annular space 556 communicate with each other is formed in the cylindrical portion 540C so as to be at the central position in the direction of the axis 508. A plurality of guide vanes 562C is provided in the third communication portion 562 at intervals in the circumferential direction.

The fluid 502 enters from the inlet port 512 of the outer casing 504 is introduced into the first annular space 546 through the first communication portion 548, is rectified by the guide vanes in the third communication portion 562, and then flows into the second annular space 556. Thereafter, the fluid 502 flows out from the second annular space 556 through the openings 558 toward one end 518 and the other end 520 of the outer casing 504. That is, the fluid 502 flows to the inner space 544 through the space between the rotor shaft 530 and the cylindrical portion 540C as the gas passage of the fluid 502.

The first outlet portion casing 540B is attached to the inner surface of the outer casing 504 close to one end 518 thereof with respect to the partition housing 540A, and the second outlet portion casing 540B is attached to the inner surface of the outer casing 504 close to the other end 520 thereof with respect to the partition housing 540A.

The first outlet portion casing 540B has an annular fixture 554 that comes into contact with and is fixed to one side surface of the outer annular portion 540D, and a cylindrical main body 564 that extends toward one end 518 of the outer casing 504 in the direction of the axis 508 from the annular fixture 554 to fix one of the head members 542 to itself. The second outlet portion casing 540B has the another annular fixture 554 that comes into contact with and is fixed to the other side surface of the outer annular portion 540D, and another cylindrical main body 564 that extends toward the other end 520 of the outer casing 504 in the direction of the axis 508 from the annular fixture 554 to fix the other of head members 542 to itself. The annular fixture 554 is formed as an annular shape centered around the axis 508 so as to come into contact with the outer annular portion 540D, and is fixed via bolts.

In addition, the annular fixtures 554 of the first outlet portion casing 540B has a first projection 552 formed as an annular shape in the circumferential direction and which is fitted to the groove portion 550 formed on one side surface of the outer annular portion 540D. Also, the annular fixtures 554 of the second outlet portion casing 540B has another first projection 552 formed as an annular shape in the circumferential direction and which is fitted to the groove portion 550 formed on the other side surface of the outer annular portion 540D. The cylindrical main body 564 is formed integrally with the annular fixture 554. The outer circumferential surface 566 of the cylindrical main body 564 extends in the direction along the axis 508, and the cylindrical main body 564 is engaged with the inner surface of the outer casing 504. The head member 542A is fixed to a distal end surface of the cylindrical main body 564 of the first outlet portion casing 540B via bolts or the like. Also, the head member 542B is fixed to a distal end surface of the cylindrical main body 564 of the second outlet portion casing 540B via bolts or the like.

A second projection 568 formed as an annular shape in the circumferential direction is formed on the inner surface of the cylindrical main body 564 of the first outlet portion casing 540B so as to be positioned close to the distal end surface of the cylindrical main body 564. Also, another second projection 568 formed as an annular shape in the circumferential direction is formed on the inner surface of the cylindrical main body 564 of the second outlet portion casing 540B so as to be positioned close to the distal end surface of the cylindrical main body 564.

In addition, the cylindrical main body 564 of the first outlet portion casing 540B is provided with a second communication portion 570 as a through-hole passing in the radial direction so as to cause the inner space 544 and the outlet port 516 in the outer casing 504 to communicate with each other. Also, the cylindrical main body 564 of the second outlet portion casing 540B is provided with another second communication portion 570 as a through-hole passing in the radial direction so as to cause the inner space 544 and the outlet port 516 in the outer casing 504 to communicate with each other. The fluid 502 flowing through the gas passage between the row of stator vanes 536 and the row of the moving blades 538 in the inner space 544 exits to the outside of the outer casing 504 from the outlet port 516 via the second communication portions 570.

A first head member 542A is fixed to the cylindrical main body 564 of the first outlet portion casing 540B via bolts or the like so as to face the partition housing 540A in the direction of the axis 508. A second head member 542B is fixed to the cylindrical main body 564 of the second outlet portion casing 540B via bolts or the like so as to face the partition housing 540A in the direction of the axis 508.

The first head 542A is formed as an annular shape centered around the axis 508, and is provide with a step portion 572 having three steps by being recessed in a disc shape centered around the axis 508 from the end surface facing one end 518 of the outer casing 504. Because of this, thereby, three surfaces of a first surface 572A, a second surface 572B, and a third surface 572C facing the radial direction, and three surfaces of a first step surface 572D, a second step surface 572E and a third step surface 572F facing the axis 508 direction are sequentially formed from one end 518 of the outer casing 504. The bearing 532 is engaged with the second step surface 572E and the second surface 572B, and is fixed via bolts or the like. The construction of the first head 542A is not limited to this arrangement, as any number of step surfaces may be formed to interface with the bearing 532, or other items.

In addition, the first head 542A is provided with an inner step portion 574 having a step shape of two steps when viewed in the radial direction, by being dented in an annular shape centered around the axis 508 at the outer end position in the radial direction, on the surface facing the other end 520 of the outer casing 504. Two surfaces of a first surface 574A and a second surface 574B facing the radial direction are sequentially formed from the other end 520 of the outer casing 504, and two surfaces of a first step surface 574C and a second step surface 574D facing the axis 508 direction are sequentially formed from the other end 520 of the outer casing 504. The second projection 568 of the cylindrical main body 564 is fitted to the first step surface 574C and the first surface 574A, and the leading end portion located on the head member 542 side rather than the second projection 568 of the cylindrical main body 564 is fitted to the second step surface 574D and the second surface 574B. In this state, the first head 542A is fixed to the cylindrical main body 564 in the end portion of the outer end in the radial direction.

An annular outlet guide 576 is disposed on the side surface of the first head 542A facing the other end 520 of the outer casing 504 so as to face the partition housing 540A in the direction along the axis 508. The outlet guide 576 has a guiding surface 576A that is gradually curved outward from the inside in the radial direction as close to one end 518 of the outer casing 504, that is as separate from the central position in the direction of the axis 508. The guiding surface 576A guides the fluid 502, which enters from the inlet port 512 and flows in the gas passage in the inner space 544 toward one end 518 of the outer casing 504, toward the second communication portion 570 formed in the first outlet portion casing 540B. Furthermore, an inner circumferential surface of the outlet guide 576 faces the outer circumferential surface 530A of the rotor shaft 530, and a sealing member 578 for reducing the gas-leak is provided between the outlet guide 576 and the rotor shaft 530.

In addition, the first head 542A is formed with a head recessed portion 580 dented annularly in the direction along the axis 508 and the radial direction so that a corner portion of the outer end in the radial direction on one end 518 of the outer casing 504 is chamfered. In the state where the whole rotor assembly 506 is inserted into the outer casing 504, the head recessed portion 580 is located so as to face the recessed portion 526 of the outer casing 504, and the surfaces facing one end 518 of the outer casing 504 in the head recessed portion 580 and the recessed portion 526 of the outer casing 504 are the same surface. In this state, a restriction ring 528 is provided which is fitted to the head recessed portion 580 and the recessed portion 526 of the outer casing 504 and restricts the movement of the first head 542A to one end 518 of the outer casing 504.

The second head 542B is formed as an annular shape as in the first head 542A, and is provided with a step portion 582 having two steps by being recessed in a disc shape centered around the axis 508 from the end surface facing the other end 520 of the outer casing 504. Because of this, two surfaces of a first surface 582A and a second surface 582B facing the radial direction and two surfaces of a first step surface 582C and a second step surface 582D facing the axis 508 direction are sequentially formed from the other end 520 of the outer casing 504. The bearing 532 is engaged with the second step surface 582D and the second surface 582B and is fixed via bolts or the like.

In addition, as in the first head 542A, the second head 542B is provided with an inner step portion 584 having a step shape of two steps when viewed in the radial direction, by being dented in an annular shape centered around the axis 508 at the outer end position in the radial direction, on the surface facing one end 518 of the outer casing 504, and a first surface 584A, a second surface 584B, a first step surface 584C and a second step surface 584D are formed. In this state, the second head 542B is fixed to the cylindrical main body 564 in the outer end in the radial direction.

As in the first head 542A, an annular outlet guide 576 is disposed on the side surface of the second head 542B facing one end 518 of the outer casing 504 so as to face the partition housing 540A in the direction along the axis 508. The outlet guide 576 has a guiding surface 576A that is gradually curved outward from the inside in the radial direction as close to the other end 520 of the outer casing 504, that is as separate from the central position in the direction of the axis 508. The guiding surface 576A guides the fluid 502, which enters from the inlet port 512 and flows in the gas passage in the inner space 544 toward the other end 520 of the outer casing 504, toward the second communication portion 570 formed in the second outlet portion casing 540B. Furthermore, an inner circumferential surface of the outlet guide 576 faces the outer circumferential surface 530A of the rotor shaft 530, and a sealing member 578 for reducing the gas-leak is provided between the outlet guide 576 and the rotor shaft 530.

In addition, in the second head 542B, on the other end 520 of the outer casing 504, a head projection 542C protruding annularly centered around the axis 508 toward the other end 520 from the middle position in the radial direction is integrally provided. The surface facing outward the radial direction of the head projection 542C is engaged with the projection 524 in the outer casing 504. Furthermore, at the outer position of the head projection 542C in the radial direction, the end surface of the second head 542B facing the other end 520 of the outer casing 504 is engaged with the projection 524. That is, the projection of the second head 542B from the outer casing 504 toward the other end 520 is restricted by the projection 524. Thereby, the projection of the whole rotor assembly 506 to the other end 520 in the direction along the axis 508 is restricted.

Next, the row of stator vanes 536 and the row of moving blades 538 will be described. The row of stator vanes 536 is a vane member fixed to the cylindrical portion 540C in the partition housing 540A, and a plurality of rows thereof is provided at the position interposed between the opening 558 in the inner annular portion 540E and the guiding surface 576A of the outlet guide 576 provided in the head member 542 at intervals in the direction of the axis 508. Furthermore, in the embodiment, four rows of the stator vanes 536 are provided in each of one end 518 and the other end 520 of the outer casing 504 so as to be symmetrical to one end 518 and the other end 520 in the direction along the axis 508 with respect to the hypothetical line 510 serving as the central position in the direction along the axis 508.

Each of the rows of stator vanes 536 includes a plurality of stator vanes 536A provided circumferentially on the inner circumferential surface 560 of the cylindrical portion 540C at predetermined intervals. The stator vanes 536A are fixed to the cylindrical portion 540C via an annular partition 586 provided on the inner circumferential surface 560 of the cylindrical portion 540C, and extend so as to face the outer circumferential surface 530A of the rotor shaft 530 inward in the radial direction, that is, toward the rotor shaft 530.

Although the detailed description will be omitted, each of the stator vanes 536A forms a cross-section of a blade shape in which a dorsal surface facing the one end in the circumferential direction has a projecting shape, and a ventral surface facing the other in the circumferential direction has a recessed shape, and the sealing member 588 for reducing the leak flow at the position facing the rotor shaft 530 is provided. The sealing member can include any number of different seal types, such as labyrinth seals, honeycomb seals, hole pattern seals, oil seals, gas seals, and bushing floating ring seals, among others.

The row of moving blades 538 is a blade member fixed to the outer circumferential surface 530A of the rotor shaft 530, and is provided so as to be alternately adjacent to the row of stator vanes 536 at the position of the downstream side of each of the row of stator vanes 536, that is, near one end 518 of the outer casing 504 rather than the opening 558. In addition, at the position of the other end 520 in the direction of the axis 508 further than the opening 558, the row of moving blades 538 is also provided so as to be alternately adjacent to the row of stator vanes 536. In this manner, in the present embodiment, four rows are provided in each of one end 518 and the other end 520 in the direction along the axis 508 so as to be symmetrical to one end 518 and the other end 520 in the direction along the axis 508 with respect to the hypothetical line 510 serving as the central position in the direction along the axis 508.

Each of the row of moving blades 538 includes a number of individual blades 538A provided circumferentially on the outer circumferential surface of the rotor shaft 530 at predetermined intervals, the individual blades 538A are fixed to the rotor shaft 530, and extend outward in the radial direction, that is, toward the partition 586 for fixing the stator vanes 536A.

Although the detailed description will be omitted, each of the individual blades 538A forms a cross-section of a blade shape in which a dorsal surface facing the other end in the circumferential direction has a projecting shape, and a ventral surface facing the one end in the circumferential direction has a recessed shape.

In this manner, the portion in the inner space 544 provided with the row of stator vanes 536 and the row of moving blades 538 serves as a gas passage of the fluid 502, the fluid 502 flowed-in from the opening 558 distributes in the gas passage, pressure energy of the fluid 502 is converted into speed energy and is finally converted into rotation energy of the rotor shaft 530. The fluid 502 decreases in pressure and expands while circulating in one end 518 and the other end 520 of the outer casing 504, that is, while distributing downward in the gas passage.

In the axial flow expander 500, a so-called double flow type is adopted which causes the fluid 502 to flow in the gas passage of the inner space 544 from the suction port 512 of the outer casing 504 provided at the central position in the direction along the axis 508 via the first communication portion 548, further causes the fluid 502 to be distributed in both directions of one end 518 and the other end 520 in the gas passage of the outer casing 504, and causes the fluid 502 to flow out of the discharge port 516 via the second communication portion 570.

Thus, when the fluid 502 is decompressed and expanded by passing through the gas passage to rotate the rotor shaft 530, thrust power acting in the direction along the axis 508 is generated according to the rotation of the row of moving blades 538. Herein, by making the structure in the rotor assembly 506 to the double flow type, the thrust power generated in each direction along the axis 508 is cancelled, and even if the row of moving blades 538 increases according to the increase in flow rate and the generated thrust power increases, the stable operation is possible.

Furthermore, in the rotor assembly 506, the row of stator vanes 536 and the row of moving blades 538 are provided symmetrically with reference to the hypothetical line 510. For this reason, the thrust power is symmetrically generated in one end 518 and the other end 520 of the outer casing 504 with respect to the hypothetical line 510 of the central position of the direction along the axis 508. Thus, it is possible to further increase the effect of cancelling the thrust power.

In addition, since the rotor shaft 530, the row of stator vanes 536 and the row of moving blades 538 are integrated in the state of being covered by the inner casing 540 and the rotor assembly 506 is inserted into the outer casing 504, the division surface is not present in the outer casing 504. Thus, the outer casing 504 does not require the fastening component or the like, reducing the number of the components. Since the division surface is not present in the outer casing 504, the fluid 502 does not leak from the inner space 544 through the division surface, and there is no need for leak measures.

Furthermore, in the state where the bearing 532 is also included in the integral rotor assembly 506, the rotor assembly 506 can be installed by inserting the rotor assembly 506 into the outer casing 504. For that reason, there is no need to separately provide the bearing stand outside the outer casing 504 to bear the bearing 532. Thus, since there is also no need for alignment adjustment or the like between the outer casing 504 and the bearing stand, easier installation is possible.

The inner casing 534 in the rotor assembly 506 is provided with the partition housing 540A, the outlet portion casing 540B, and the head member 542. Thus, even if the rotor assembly 506 increases in size in accordance with the increase in flow rate, the rotor assembly 506 can be easily assembled.

Furthermore, the assembly of the outlet portion casing 540B of the inner casing body 540 and the partition housing 540A is performed in the state where the first projection 552 is fitted into the groove portion 550. Furthermore, since the assembly of the outlet portion casing 540B and the head member 542 is performed in the state where the inner step portion 574 is fitted into the second projection 568, positioning thereof is easily performed, and thus the labor required for installation can be reduced.

In addition, since the head member 542 is provided with the outlet guide 576, the fluid 502 passing through the gas passage between the row of stator vanes 536 and the row of moving blades 538 can be guided outward in the radial direction by the guiding surface 576A, and thus the fluid 502 can be smoothly discharged from the discharge port 516 through the second communication portion 570.

According to the axial flow expander 500 of the embodiment, the double flow type rotor assembly 506, which has the rotor shaft 530, the bearing 532, the row of stator vanes 536, and the row of moving blades 538 is integrally assembled within the inner casing 540, which is inserted into the outer casing 504. For this reason, since the flow rate can be increased and the leakage of the fluid 502 from the outer casing 504 can be prevented, it is possible to cope with high pressure.

The embodiment of the present invention has been described in detail. However, some design changes can be made without depart from the scope of the present claims. For example, in the embodiment of the present invention, although the inner casing 534 is provided with the outlet portion casing 540B, the partition housing 540A and the head member 542, the components may be a one-piece structure.

In addition, the head member 542 and the outlet guide 576 also may be a one-piece structure like the inner casing 534. Although the first projection 552 and the second projection 568 are formed which prevent the position deviation when fixing the outlet portion casing 540B, the partition housing 540A and the head member 542 one another, the shapes and the forming positions thereof are not limited to the above-mentioned embodiment.

Furthermore, in the above-mentioned embodiment, the suction port 512 is provided at the central position in the direction along the axis 508, the discharge ports 516 are provided in one end 518 and the other end 520 of the outer casing 504, and the row of stator vanes 536 and the row of moving blades 538 are placed such that one end 518 and the other end 520 are completely in bilateral-symmetrical with respect to the central position in the direction along the axis 508. However, the installing position of the suction port 512 is not limited to the central position, the discharge ports 516 may be provided at least at the positions of both ends, which are one end 518 and the other end 520 with respect to the suction port 512, and the row of stator vanes 536 and the row of moving blades 538 may not be provided so as to be completely symmetrical in one end 518 and the other end 520 with respect to the hypothetical line 510.

FIG. 6 is a cross section view of another axial flow expander 600. In FIG. 6, like numbered items are as discussed with respect to FIG. 5. The axial flow expander 600 may be provided with two suction ports 602 and 604 having a separation in the circumferential direction along the axis 508 so as to protrude outward in the radial direction along the axis 508 at the central position where the hypothetical line 510 is drawn. The axial flow expander 600 has a two-section structure capable of causing the gas 606 supplied from the suction port 602 to flow to the discharge port 608 of one end 518 of the outer casing 504 and capable of causing the gas 610 supplied from the suction 604 to flow to the discharge port 612 of the other end 520 of the outer casing 504. Thus, it is possible to perform the operation of causing the gases 606 and 610 each having the different conditions to distribute. Accordingly, the two gases 606 and 610 may be different, for example, from different refrigerant systems.

Other changes may be made in the design to the axial flow expanders shown in the FIGS. 5 and 6. For example, the projection 524 may not be necessarily provided in the outer casing 504, and in this case, it is possible to insert the rotor assembly 506 from either end 518 or 520 of the casing 504. Furthermore, the guiding surface 576A of the outlet guide 576 may not be curved, and may be formed so as to be linearly inclined when viewed in the circumferential direction. Furthermore, the plurality of guide vanes provided circumferentially in the third communication portion 562 at intervals may not have necessarily a vane shape but a cross-section thereof in the direction of the axis 508 may be a circular shape or the like. In some embodiments, the axial turbine is not extended in both directions, but has blades only in one direction.

FIG. 7 is a cross section view of an axial flow expander 700 having blades along only on direction of the axis 508. Like numbered items are as discussed with respect to FIG. 5. The single flow path may simplify some operations, for example, the rotor assembly 506 may be supported by a solid structure 702, and the outer casing 504 may be removed to service the axial flow expander 700. In a configuration that has a single flow direction, for an equivalent amount of flow, the rotor assembly 506 may have a larger width and blades than a configuration that has two flow directions for the blades. Accordingly, large thrust bearings 704 may be used to offset higher thrust forces that may be present.

Figure 8:
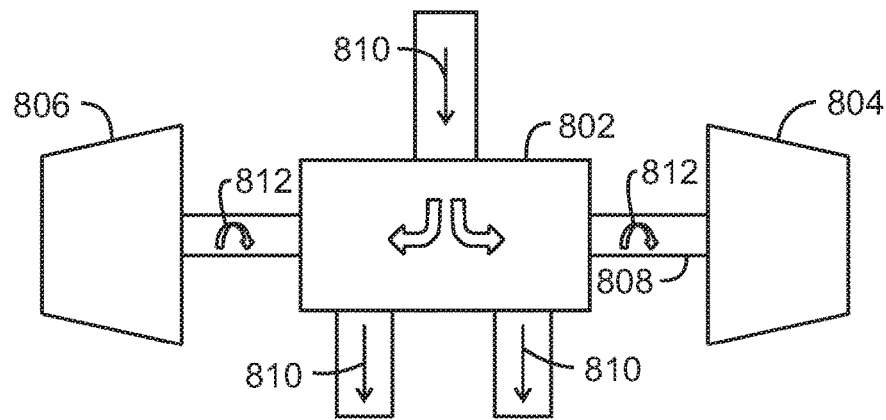
FIG. 8 is a schematic diagram of an axial flow expander used to drive two compressors, one from each end of an axis.

FIG. 8 is a schematic diagram of a system 800 in which an axial flow expander 802 is used to drive two compressors 804 and 806, one from each end of a shaft 808. As the fluid 810 flows through the axial flow expander 802, the energy lost through pressure reduction causes a rotation 812 of the shaft 808. The axial flow expander 802 is shown with two internal flow paths 814, for example, as discussed with respect to FIG. 5. However, the axial flow expander 802 may include any number of other configurations, such as the two gas configuration discussed with respect to FIG. 6, and the single direction flow discussed with respect to FIG. 7. The ability to couple other units at both ends of the shaft 808 allows the thrust from each of the external units to be balanced, decreasing the need for a thrust bearing.

Although the external units attached to the ends of the shaft 808 are shown as compressors 804 and 806, it can be noted that any combinations of different units may be attached to the shaft 808, such as generators, compressors, pumps, and the like. Further, different types of units may be attached at the opposite ends of the shaft 808, although thrust balancing may be a greater concern in these embodiments.

Figure 9:
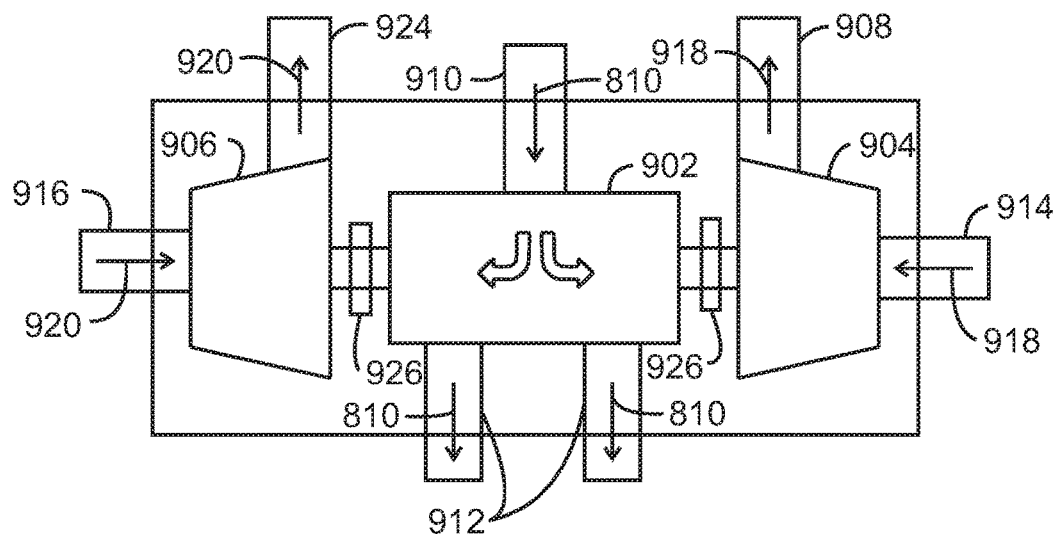
FIG. 9 is a schematic diagram of an axial flow expander driving two compressors, in which the entire system is enclosed in a seal case.

FIG. 9 is a schematic diagram of a sealed system that includes an axial flow expander 902 driving two compressors 904 and 906. Like numbered items are as discussed with respect to FIG. 8. In this embodiment, the axial flow expander 902 and compressors 904 and 906 are designed to be placed as a single unit into a single outer casing 908 with minimal connections penetrating the outer casing 908. For example, the axial flow expander 902 can have an inlet 910 for the fluid 810, and outlets 912 for the low pressure fluid 810. Similarly, each compressor 904 and 906 can have a separate inlet 914 and 916 for a fluid 918 or 920, and outlet 922 and 924 for the compressed fluids 918 or 920. To allow a sealed system, magnetic bearings 926 can be used to support the shaft.

Figure 10:
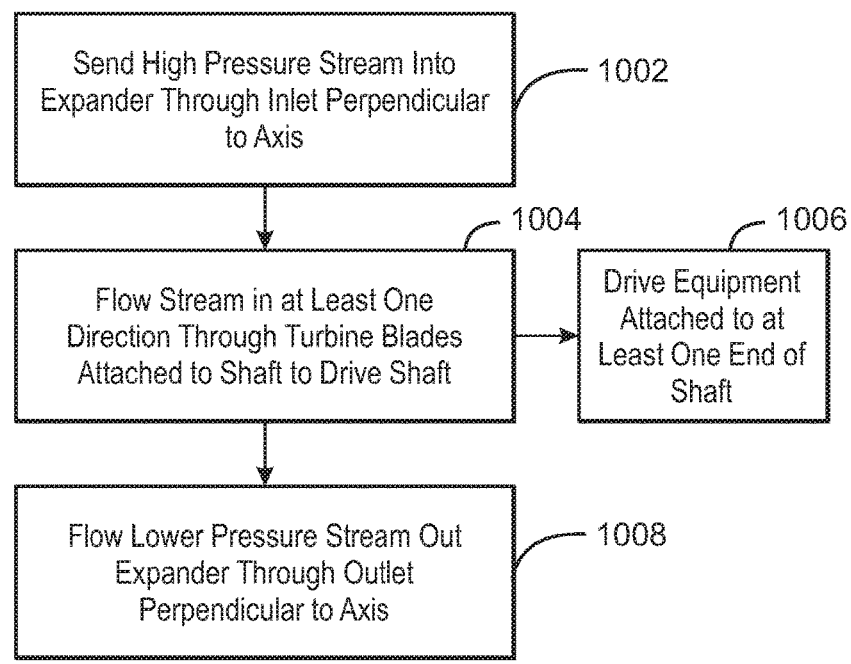
FIG. 10 is a flow chart of a method for reducing energy in a flow stream using an axial flow expander.

FIG. 10 is a flow chart of a method 1000 for reducing energy in a flow stream using an axial flow expander. The method begins at block 1002 when a high pressure stream is sent into a turbine expander through an inlet that is perpendicular to an axis. At block 1004, the high pressure stream is flowed through a set of turbine blades mounted along a shaft in at least one direction. At block 1006, energy removed during the depressurization of the high pressure stream is used to drive equipment attached to at least one end of the shaft. At block 1008, the lower pressure stream is flowed out of the axial flow expander through at least one outlet positioned perpendicular to the axis.

Embodiments

Embodiments of the invention may include any combinations of the methods and systems shown in the following numbered paragraphs. This is not to be considered a complete listing of all possible embodiments, as any number of variations can be envisioned from the description above.

1. A system for decreasing a temperature of a fluid, including an axial flow expander for expanding gas flowed in a direction along an axis thereof, including:
   an outer casing centered around the axis, wherein the outer casing is a unified structure having an inlet port and an outlet port;
   an inner casing centered around the axis, fixed inside the outer casing, wherein the inner casing has a gas passage configured to allow gas to enter the inner casing from the inlet port of the outer casing and exit the inner casing to the outlet port of the outer casing;
   a rotor shaft accommodated inside the inner casing, and of which an axial center is aligned with the axis;
   a plurality of bearings fixed to the inner casing, wherein the plurality of bearings is configured to allow the rotor shaft to rotate around the axis with respect to the inner casing;
   a plurality of stator vanes fixed to the inner casing so as to protrude inward from an inner surface of the inner casing, wherein the plurality of stator vanes is arranged inside the gas passage so as to be separated at intervals in the direction of the axis; and
   a plurality of moving blades fixed to the rotor shaft so as to protrude outward from the rotor shaft, and arranged inside the gas passage so as to be alternating with the plurality of stator vanes;
   wherein the inner casing, the rotor shaft, the bearings, the stator vanes, and the moving blades are integrally assembled, and the assembled members are inserted into the outer casing in the direction along the axis.

2. The axial flow expander of paragraph 1, wherein the inner casing includes:
   an inner casing body having the stator vanes; and
   a head member fixed to both ends of the inner casing body in the direction of the axis, and to which the bearing is fixed.

3. The axial flow expander of either of paragraphs 1 or 2, wherein the inner casing body includes:
   a main body having the stator vanes; and
   a connection portion fixed to both ends of the main body in the direction of the axis, to which the head member is fixed.

4. The axial flow expander of any one of paragraphs 1-4, wherein the bearing includes an oil lubricated bearing, a roller bearing, an air bearing, or any combinations thereof.

5. The axial flow expander of any one of paragraphs 1-5, wherein the bearing includes a magnetic bearing.

6. The axial flow expander of any one of paragraphs 1-5, wherein the bearing includes a thrust bearing.

7. The axial flow expander of any one of paragraphs 1-6, including a seal along the rotor shaft, wherein the seal is configured to prevent fluid from leaking out along the shaft.

8. The axial flow expander of paragraph 7, wherein the seal includes an oil seal, a gas seal, a labyrinth seal, a brushing floating ring seal, a honeycomb seal, a hole pattern seal, or any combinations thereof.

9. The axial flow expander of any one of paragraphs 1-8, wherein the axial flow expander is configured to allow the fluid to flow in opposing directions along the shaft.

10. The axial flow expander of any one of paragraphs 1-9, including a process unit coupled to the rotor shaft, wherein the process unit is configured to be powered by the rotor shaft.

11. The axial flow expander of paragraph 10, wherein the process unit includes a compressor, a generator, or a pump, or any combinations thereof.

12. The axial flow expander of any one of paragraphs 1-11, including a process unit coupled to each opposing end of the rotor shaft, wherein each process unit is configured to be powered by the rotor shaft.

13. The axial flow expander of paragraph 12, wherein each processing unit includes a generator, a compressor, or a pump, or any combinations thereof.

14. The axial flow expander of paragraph 12, wherein both processing units coupled to the shaft include a compressor.

15. The axial flow expander of paragraph 14, including a single case holding the axial flow expander and both compressors, wherein upon assembly, the case only has openings for fluid inlets and fluid outlets for the axial flow expander and each of the compressors.

16. A method for cooling a fluid in an axial flow expander, including:
   flowing a high-pressure fluid into the axial flow expander, wherein the axial flow expander includes:
      an outer casing centered around the axis, wherein the outer casing is a unified structure having an inlet port and an outlet port;
      an inner casing centered around the axis, fixed inside the outer casing, wherein the inner casing has a gas passage configured to allow gas to enter the inner casing from the inlet port of the outer casing and exit the inner casing to the outlet port of the outer casing;
      a rotor shaft accommodated inside the inner casing, and of which an axial center is aligned with the axis;
      a plurality of bearings fixed to the inner casing, wherein the plurality of bearings is configured to allow the rotor shaft to rotate around the axis with respect to the inner casing;
      a plurality of stator vanes fixed to the inner casing so as to protrude inward from an inner surface of the inner casing, wherein the plurality of stator vanes is arranged inside the gas passage so as to be separated at intervals in the direction of the axis; and
      a plurality of moving blades fixed to the rotor shaft so as to protrude outward from the rotor shaft, and arranged inside the gas passage so as to be alternating with the plurality of stator vanes;
      wherein the inner casing, the rotor shaft, the bearings, the stator vanes, and the moving blades are assembled into a single unit and inserted into the outer casing in the direction along the axis;
   expanding the fluid in the axial flow expander turning the rotor shaft;
   removing energy from the fluid through imparting mechanical energy into the rotor shaft coupled to a mechanical device; and
   flowing the cooled fluid into a downstream process unit.

17. The method of paragraph 16, including driving a generator by the mechanical energy of the rotor shaft.

18. The method of either of paragraphs 16 or 17, including driving a compressor or pump unit by the mechanical energy from the rotor shaft.

19. The method of any one of paragraphs 16-18, including driving a separate compressor, pump or generator attached to each, opposing, end of the rotor shaft.

20. The method of any one of paragraphs 16-19, including cooling a natural gas stream to form a liquefied natural gas stream.

21. The method of any one of paragraphs 16-20, including cooling a refrigerant for a refrigeration cycle.

22. The method of any one of paragraphs 16-21, including cooling a hot, high pressure exhaust stream.

23. The method of any one of paragraphs 16-22, including cooling a gas stream.

24. The method of any one of paragraphs 16-23, including cooling a gas stream to form both a liquid phase and a gas phase.

25. The method of paragraph 24, including separating the liquid phase from the gas phase to effect a separation of components by molecular weight.

26. A liquefied natural gas (LNG) plant, including:
 a gas treatment plant configured to remove impurities from a raw natural gas feed to form a treated natural gas, wherein the treated natural gas is flowed into a chiller system; and
 the chiller system including an axial flow expander for expanding gas flowed in a direction along an axis thereof, including:
 an outer casing centered around the axis, wherein the outer casing is a unified structure having an inlet port and an outlet port;
 an inner casing centered around the axis, fixed inside the outer casing, wherein the inner casing has a gas passage configured to allow gas to enter the inner casing from the inlet port of the outer casing and exit the inner casing to the outlet port of the outer casing;
 a rotor shaft accommodated inside the inner casing, and of which an axial center is aligned with the axis;
 a plurality of bearings fixed to the inner casing, wherein the plurality of bearings is configured to allow the rotor shaft to rotate around the axis with respect to the casing;
 a plurality of stator vanes fixed to the inner casing so as to protrude inward from an inner surface of the inner casing, wherein the plurality of stator vanes is arranged inside the gas passage so as to be separated at intervals in the direction of the axis; and
 a plurality of moving blades fixed to the rotor shaft so as to protrude outward from the rotor shaft, and arranged inside the gas passage so as to be alternating with the plurality of stator vanes;
 wherein the inner casing, the rotor shaft, the bearings, the stator vanes, and the moving blades are integrally assembled, and the assembled members are inserted into the outer casing in the direction along the axis.

27. The LNG plant of paragraph 28, including a refrigerant system, including the axial flow expander.

28. The LNG plant of either of paragraphs 26 or 27, including a refrigerant system including:
 a compressor;
 a heat exchanger; and
 the axial flow expander, wherein a fluid flow is compressed in the compressor, cooled in the heat exchanger; and chilled by expansion in the axial flow expander.

29. The LNG plant of paragraph 28, including a heat exchange unit downstream of the axial flow expander.

30. The LNG plant of any one of paragraphs 26-29, wherein the fluid is natural gas, a refrigerant, or both.

31. The LNG plant of any one of paragraphs 26-30, including a heat exchange unit.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A system for decreasing a temperature of a fluid, comprising an axial flow expander for expanding gas flowed in a direction along an axis thereof, comprising:
 an outer casing formed as a cylindrical body centered around the axis, wherein the outer casing is a unified structure having an inlet port and an outlet port; and
 a rotor assembly, comprising an inner casing formed as a cylindrical shape centered around the axis, wherein the inner casing has a gas passage configured to allow gas to enter the inner casing from the inlet port of the outer casing and exit the inner casing to the outlet port of the outer casing; wherein the rotor assembly comprises:
 a rotor shaft accommodated inside the inner casing, and of which an axial center is aligned with the axis;
 a plurality of bearings fixed to the inner casing, wherein the plurality of bearings is configured to allow the rotor shaft to rotate around the axis with respect to the inner casing;
 a plurality of stator vanes fixed to the inner casing so as to protrude inward from an inner surface of the inner casing, wherein the plurality of stator vanes is arranged inside the gas passage so as to be separated at intervals in the direction of the axis; and
 a plurality of moving blades fixed to the rotor shaft so as to protrude outward from the rotor shaft, and arranged inside the gas passage so as to be alternating with the plurality of stator vanes; and
 wherein the inner casing, the rotor shaft, the bearings, the stator vanes, and the moving blades are integrally assembled in the inner casing to form the rotor assembly; and
 wherein the rotor assembly is configured to be inserted into the outer casing through an opening along the axis, and held in place in the outer casing by a restriction ring.

2. The axial flow expander of claim 1, wherein the inner casing comprises:
 an inner casing body having the stator vanes; and
 a head member fixed to both ends of the inner casing body in the direction of the axis, and to which the plurality of bearings is fixed.

3. The axial flow expander of claim 2, wherein the inner casing body comprises:
 a main body having the stator vanes; and
 a connection portion fixed to both ends of the main body in the direction of the axis, to which the head member is fixed.

4. The axial flow expander of claim 1, wherein the plurality of bearings comprises an oil lubricated bearing, a roller bearing, an air bearing, or any combinations thereof.

5. The axial flow expander of claim 1, wherein the plurality of bearings comprises a magnetic bearing.

6. The axial flow expander of claim 1, wherein the plurality of bearings comprises a thrust bearing.

7. The axial flow expander of claim 1, comprising a seal along the rotor shaft, wherein the seal is configured to prevent fluid from leaking out along the shaft.

8. The axial flow expander of claim 7, wherein the seal comprises an oil seal, a gas seal, a labyrinth seal, a brushing floating ring seal, a honeycomb seal, a hole pattern seal, or any combinations thereof.

9. The axial flow expander of claim 1, wherein the axial flow expander is configured to allow the fluid to flow in opposing directions along the shaft.

10. The axial flow expander of claim 1, comprising a process unit coupled to the rotor shaft, wherein the process unit is configured to be powered by the rotor shaft.

11. The axial flow expander of claim 10, wherein the process unit comprises a compressor, a generator, or a pump, or any combinations thereof.

12. The axial flow expander of claim 1, comprising a process unit coupled to each opposing end of the rotor shaft, wherein each process unit is configured to be powered by the rotor shaft.

13. The axial flow expander of claim 12, wherein each processing unit comprises a generator, a compressor, or a pump, or any combinations thereof.

14. The axial flow expander of claim 12, wherein both processing units coupled to the shaft comprise a compressor.

15. The axial flow expander of claim 14, comprising a single case holding the axial flow expander and both compressors, wherein upon assembly, the case only has openings for fluid inlets and fluid outlets for the axial flow expander and each of the compressors.

16. A method for cooling a fluid in an axial flow expander, comprising:
flowing a high-pressure fluid into the axial flow expander, wherein the axial flow expander comprises:
an outer casing formed as a cylindrical body centered around the axis, wherein the outer casing is a unified structure having an inlet port and an outlet port; and
a rotor assembly, comprising an inner casing formed as a cylindrical shape centered around the axis, wherein the inner casing has a gas passage configured to allow gas to enter the inner casing from the inlet port of the outer casing and exit the inner casing to the outlet port of the outer casing; wherein the rotor assembly comprises:
a rotor shaft accommodated inside the inner casing, and of which an axial center is aligned with the axis;
a plurality of bearings fixed to the inner casing, wherein the plurality of bearings is configured to allow the rotor shaft to rotate around the axis with respect to the inner casing;
a plurality of stator vanes fixed to the inner casing so as to protrude inward from an inner surface of the inner casing, wherein the plurality of stator vanes is arranged inside the gas passage so as to be separated at intervals in the direction of the axis; and
a plurality of moving blades fixed to the rotor shaft so as to protrude outward from the rotor shaft, and arranged inside the gas passage so as to be alternating with the plurality of stator vanes; and
wherein the inner casing, the rotor shaft, the bearings, the stator vanes, and the moving blades are integrally assembled in the inner casing to form the rotor assembly; and wherein the rotor assembly is configured to be inserted into the outer casing through an opening along the axis, and held in place in the outer casing by a restriction ring; and expanding the fluid in the axial flow expander turning the rotor shaft;

removing energy from the fluid through imparting mechanical energy into the rotor shaft coupled to a mechanical device; and flowing the cooled fluid into a downstream process unit.

17. The method of claim 16, comprising driving a generator by the mechanical energy of the rotor shaft.

18. The method of claim 16, comprising driving a compressor or pump unit by the mechanical energy from the rotor shaft.

19. The method of claim 16, comprising driving a separate compressor, pump or generator attached to each, opposing, end of the rotor shaft.

20. The method of claim 16, comprising cooling a natural gas stream to form a liquefied natural gas stream.

21. The method of claim 16, comprising cooling a refrigerant for a refrigeration cycle.

22. The method of claim 16, comprising cooling a hot, high pressure exhaust stream.

23. The method of claim 16, comprising cooling a gas stream.

24. The method of claim 16, comprising cooling a gas stream to form both a liquid phase and a gas phase.

25. The method of claim 24, comprising separating the liquid phase from the gas phase to effect a separation of components by molecular weight.

26. A liquefied natural gas (LNG) plant, comprising:
a gas treatment plant configured to remove impurities from a raw natural gas feed to form a treated natural gas, wherein the treated natural gas is flowed into a chiller system; and
the chiller system comprising an axial flow expander for expanding gas flowed in a direction along an axis thereof, comprising:
an outer casing formed as a cylindrical body centered around the axis, wherein the outer casing is a unified structure having an inlet port and an outlet port; and
a rotor assembly, comprising an inner casing formed as a cylindrical shape centered around the axis, wherein the inner casing has a gas passage configured to allow gas to enter the inner casing from the inlet port of the outer casing and exit the inner casing to the outlet port of the outer casing; wherein the rotor assembly comprises:
a rotor shaft accommodated inside the inner casing, and of which an axial center is aligned with the axis;
a plurality of bearings fixed to the inner casing, wherein the plurality of bearings is configured to allow the rotor shaft to rotate around the axis with respect to the inner casing;
a plurality of stator vanes fixed to the inner casing so as to protrude inward from an inner surface of the inner casing, wherein the plurality of stator vanes is arranged inside the gas passage so as to be separated at intervals in the direction of the axis; and
a plurality of moving blades fixed to the rotor shaft so as to protrude outward from the rotor shaft, and arranged inside the gas passage so as to be alternating with the plurality of stator vanes; and
wherein the inner casing, the rotor shaft, the bearings, the stator vanes, and the moving blades are integrally assembled in the inner casing to form the rotor assembly; and wherein the rotor assembly is configured to be inserted into the outer casing through an opening along the axis, and held in place in the outer casing by a restriction ring.

27. The LNG plant of claim 26, comprising a refrigerant system, comprising the axial flow expander.

28. The LNG plant of claim 26, comprising a refrigerant system comprising:
a compressor;
a heat exchanger; and
the axial flow expander, wherein a fluid flow is compressed in the compressor, cooled in the heat exchanger; and chilled by expansion in the axial flow expander.

29. The LNG plant of claim 28, comprising a heat exchange unit downstream of the axial flow expander.

30. The LNG plant of claim 26, wherein the fluid is natural gas, a refrigerant, or both.

31. The LNG plant of claim 26, comprising a heat exchange unit.

* * * * *